(12) United States Patent
Lee et al.

(10) Patent No.: US 10,845,596 B2
(45) Date of Patent: Nov. 24, 2020

(54) SLANTED SURFACE RELIEF GRATING FOR RAINBOW REDUCTION IN WAVEGUIDE DISPLAY

(71) Applicant: Facebook Technologies, LLC, Menlo Park, CA (US)

(72) Inventors: Hee Yoon Lee, Bellevue, WA (US); Ningfeng Huang, Redmond, WA (US); Giuseppe Calafiore, Redmond, WA (US); Pasi Saarikko, Kirland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 127 days.

(21) Appl. No.: 15/878,287

(22) Filed: Jan. 23, 2018

(65) Prior Publication Data

US 2019/0227316 A1 Jul. 25, 2019

(51) Int. Cl.
*G02B 5/18* (2006.01)
*G02B 27/01* (2006.01)
(Continued)

(52) U.S. Cl.
CPC ....... *G02B 27/0172* (2013.01); *G02B 5/1852* (2013.01); *G02B 5/1857* (2013.01);
(Continued)

(58) Field of Classification Search
CPC .......... G02B 27/0172; G02B 5/1852; G02B 5/1857; G02B 6/0016; G02B 6/0038;
(Continued)

(56) References Cited

U.S. PATENT DOCUMENTS

| 4,856,869 A | 8/1989 | Sakata et al. |
| 5,982,553 A * | 11/1999 | Bloom ................. G02B 5/1828 359/627 |

(Continued)

FOREIGN PATENT DOCUMENTS

| EP | 1183684 | 6/2008 |
| KR | 19980050572 A | 9/1998 |

OTHER PUBLICATIONS

International Application No. PCT/US2018/036515, International Search Report and Written Opinion dated Sep. 27, 2018, 15 pages.
(Continued)

*Primary Examiner* — Balram T Parbadia
(74) *Attorney, Agent, or Firm* — Weaver Austin Villeneuve & Sampson LLP

(57) ABSTRACT

A waveguide display includes a substrate having two opposite surfaces, and a slanted grating at a first surface of the two opposite surfaces of the substrate. The slanted grating includes a plurality of ridges and is characterized by a grating period in one direction. The plurality of ridges is tilted at a slant angle with respect to a surface normal of the first surface and is characterized by a height. The height of the plurality of ridges, the grating period, and the slant angle are configured to cause destructive interference between ambient light diffracted by the slanted grating. In some embodiments, a difference between the height of the plurality of ridges and an integer multiple of the grating period divided by the tangent of the slant angle is less than a threshold value.

20 Claims, 27 Drawing Sheets

(51) Int. Cl.
    *F21V 8/00*   (2006.01)
    *G02B 27/00*  (2006.01)
(52) U.S. Cl.
    CPC ......... *G02B 6/0016* (2013.01); *G02B 6/0038* (2013.01); *G02B 27/0081* (2013.01); *G02B 27/0093* (2013.01); *G02B 2027/012* (2013.01); *G02B 2027/0125* (2013.01); *G02B 2027/0138* (2013.01); *G02B 2027/0174* (2013.01); *G02B 2027/0178* (2013.01)
(58) Field of Classification Search
    CPC ...... G02B 2027/012; G02B 2027/0125; G02B 2027/0178; G02B 27/01; G02B 5/18; F21V 8/00
    See application file for complete search history.

(56) References Cited

U.S. PATENT DOCUMENTS

| | | | |
|---|---|---|---|
| 6,285,813 | B1 | 9/2001 | Schultz et al. |
| 7,088,441 | B2* | 8/2006 | Nahum .................... G01J 9/00 250/226 |
| 8,442,374 | B2* | 5/2013 | Chang-Hasnain ..... G02B 6/122 385/129 |
| 9,360,615 | B1 | 6/2016 | Jalava |
| 9,519,089 | B1* | 12/2016 | Brown ..................... G02B 5/18 |
| 2005/0211547 | A1 | 9/2005 | Hanawa et al. |
| 2005/0277063 | A1* | 12/2005 | Wang .................. G02B 5/1857 430/311 |
| 2006/0001972 | A1 | 1/2006 | Sato et al. |
| 2006/0045987 | A1 | 3/2006 | Chandler et al. |
| 2007/0159673 | A1 | 7/2007 | Freeman et al. |
| 2008/0193080 | A1* | 8/2008 | Cheben ................ G02B 6/1228 385/28 |
| 2009/0074356 | A1 | 3/2009 | Sanchez et al. |
| 2009/0097122 | A1 | 4/2009 | Niv |
| 2009/0224416 | A1 | 9/2009 | Laakkonen et al. |
| 2009/0245730 | A1* | 10/2009 | Kleemann .......... G02B 27/0101 385/37 |
| 2010/0079865 | A1 | 4/2010 | Saarikko et al. |
| 2011/0038049 | A1 | 2/2011 | Vallius et al. |
| 2011/0242635 | A1 | 10/2011 | Oka |
| 2011/0279818 | A1 | 11/2011 | Amako et al. |
| 2011/0280533 | A1* | 11/2011 | Chang-Hasnain ..... B82Y 20/00 385/131 |
| 2011/0317268 | A1* | 12/2011 | Walter ............ B29D 11/00769 359/568 |
| 2012/0062998 | A1 | 3/2012 | Schultz et al. |
| 2013/0100362 | A1 | 4/2013 | Saeedi et al. |
| 2013/0192758 | A1 | 8/2013 | Toth et al. |
| 2014/0085725 | A1 | 3/2014 | Lochbihler et al. |
| 2015/0125976 | A1 | 5/2015 | Wang |
| 2015/0253570 | A1 | 9/2015 | Sunnari et al. |
| 2015/0279686 | A1 | 10/2015 | Kuo et al. |
| 2016/0018639 | A1 | 1/2016 | Spitzer et al. |
| 2016/0033784 | A1 | 2/2016 | Levola et al. |
| 2016/0035539 | A1 | 2/2016 | Sainiemi et al. |
| 2016/0042971 | A1 | 2/2016 | Mohanty |
| 2016/0231567 | A1 | 8/2016 | Saarikko et al. |
| 2016/0301188 | A1 | 10/2016 | Mathai et al. |
| 2016/0357016 | A1 | 12/2016 | Cakmakci et al. |
| 2017/0010465 | A1* | 1/2017 | Martinez ............ G02B 27/0172 |
| 2017/0059879 | A1 | 3/2017 | Vallius |
| 2017/0236463 | A1 | 8/2017 | Chi et al. |
| 2017/0311430 | A1 | 10/2017 | Liang et al. |
| 2017/0315356 | A1* | 11/2017 | Tervo ................... G02B 6/0076 |
| 2017/0357101 | A1 | 12/2017 | Tervo et al. |
| 2018/0081176 | A1 | 3/2018 | Olkkonen et al. |

OTHER PUBLICATIONS

Miller et al., "Design and Fabrication of Binary Slanted Surface-Relief Gratings for a Planar Optical Interconnection," Applied Optics, vol. 36, No. 23, Aug. 10, 1997, 12 pages.
International Application No. PCT/US2018/058272, "International Search Report and Written Opinion," dated Mar. 11, 2019, 14 pages.
International Application No. PCT/US2019/014075, "International Search Report and Written Opinion", dated May 8, 2019, 11 pages.
U.S. Appl. No. 16/054,867, Non-Final Office Action dated Mar. 16, 2020, 8 pages.
U.S. Appl. No. 16/209,719, "Non-Final Office Action", dated Nov. 8, 2019, 10 pages.
EP19153308.2, "Extended European Search Report", dated Oct. 16, 2019, 10 pages.
U.S. Appl. No. 16/209,719, "Notice of Allowance", dated Apr. 22, 2020, 10 pages.

* cited by examiner

1500

1550

1700

1700

1800

1850

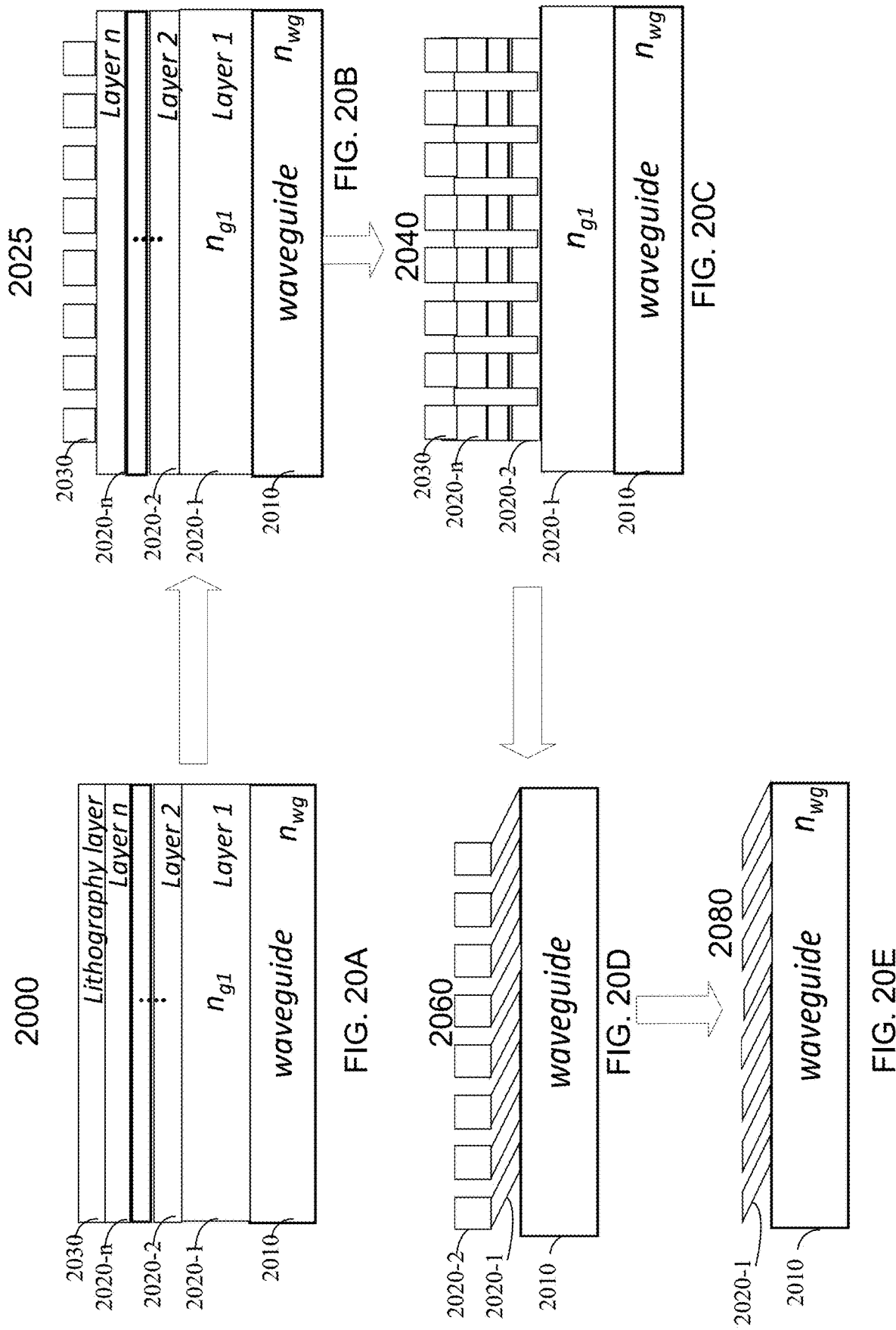

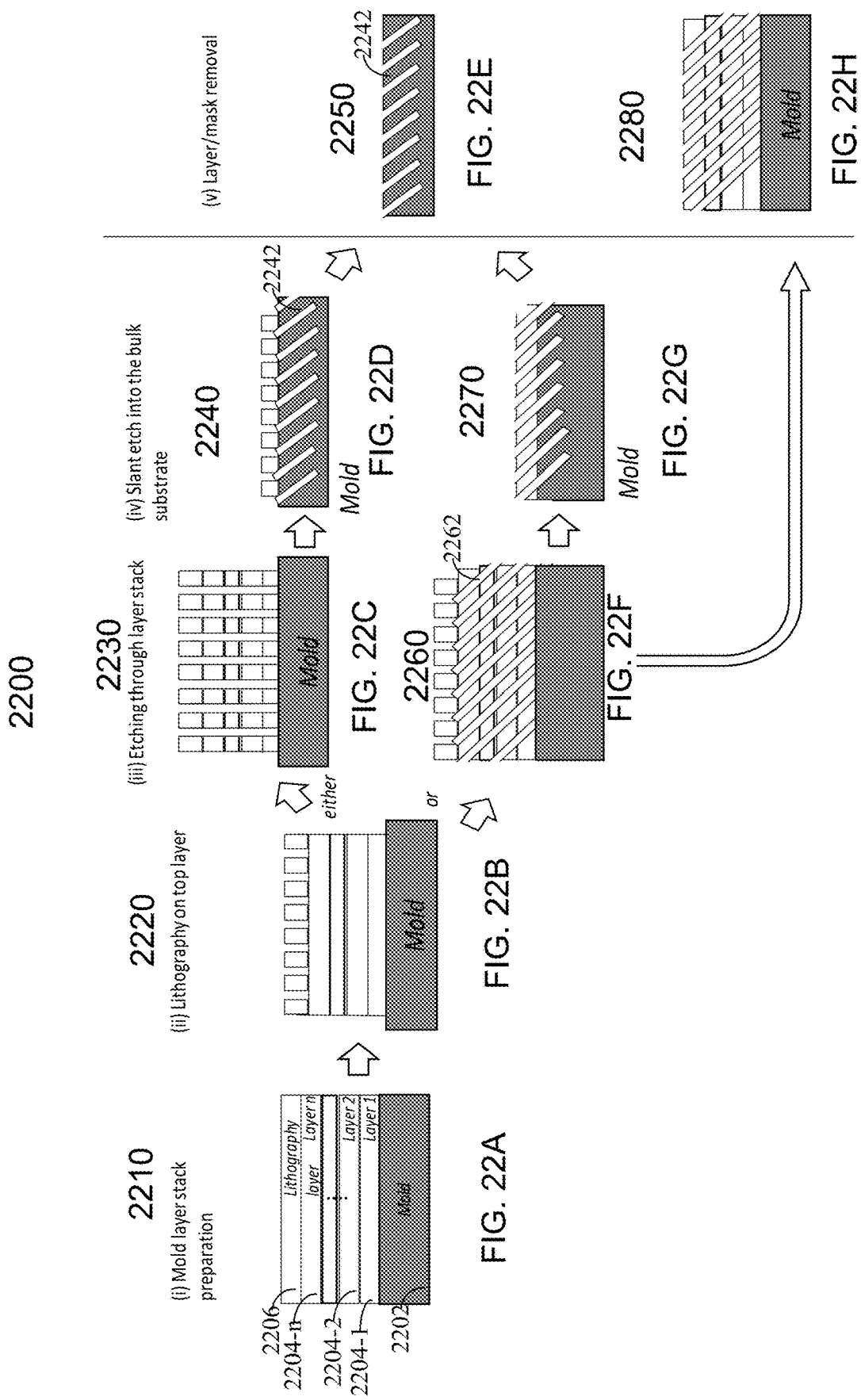

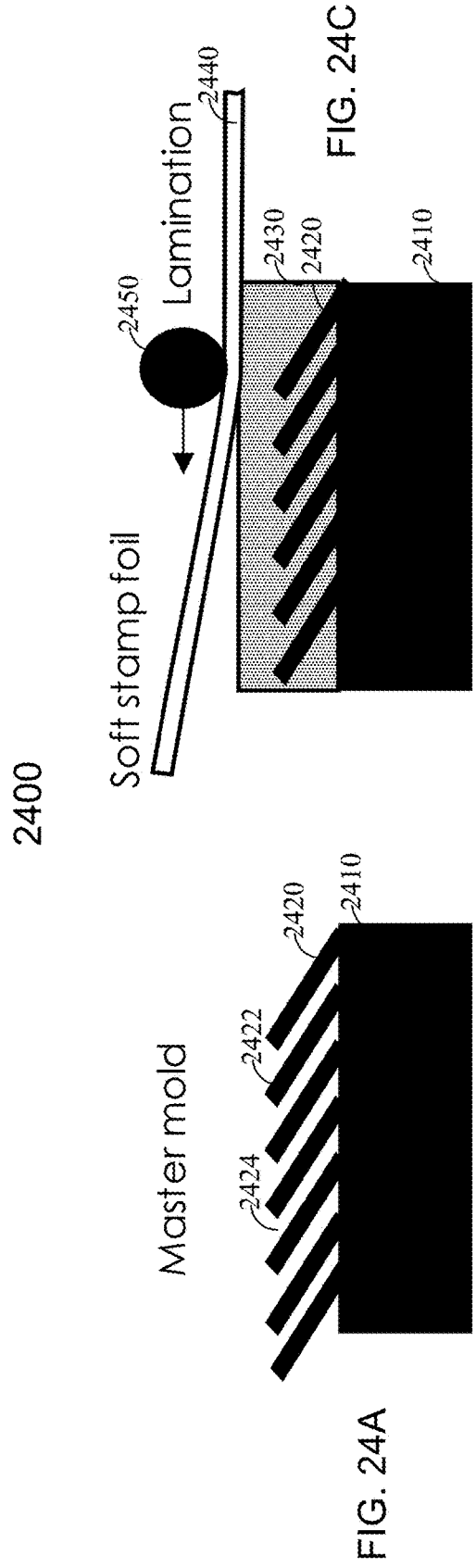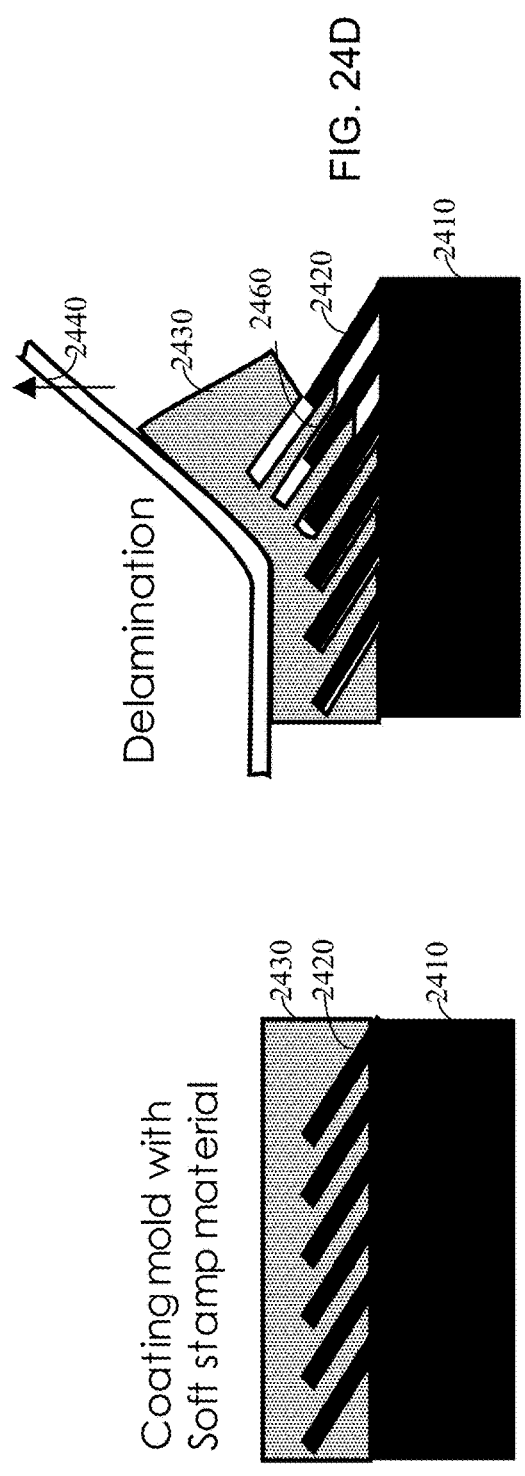

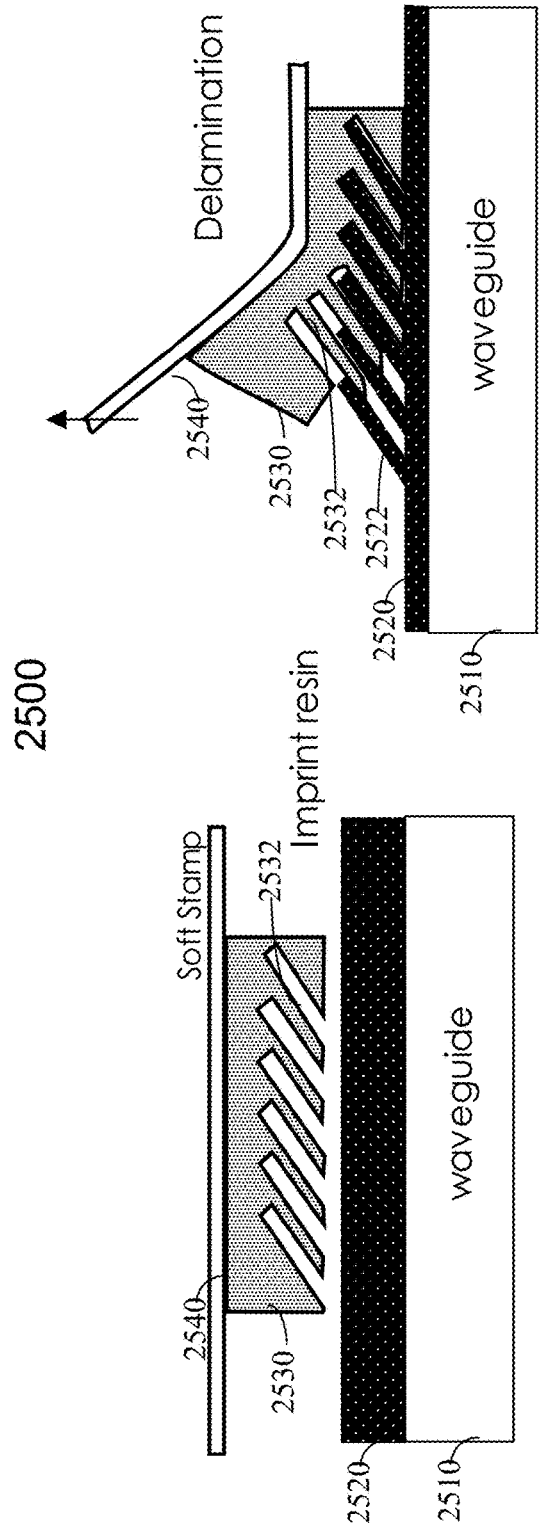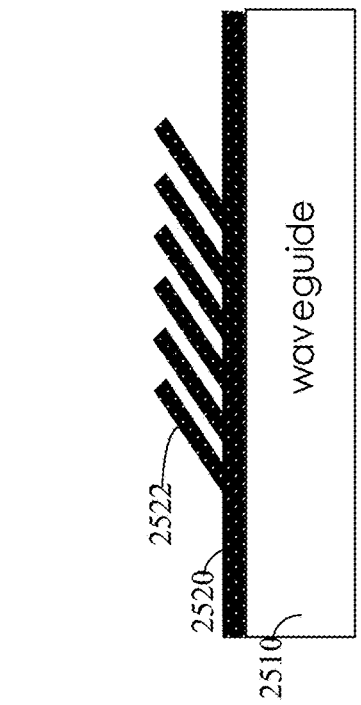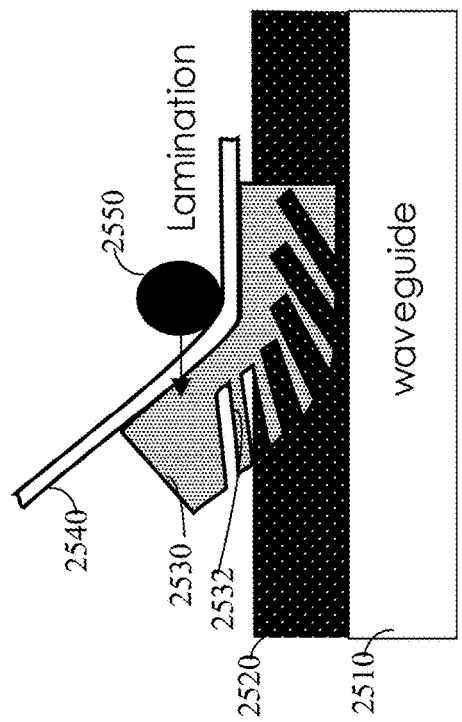

SLANTED SURFACE RELIEF GRATING FOR RAINBOW REDUCTION IN WAVEGUIDE DISPLAY

BACKGROUND

An artificial reality system, such as a head-mounted display (HMD) or heads-up display (HUD) system, generally includes a display configured to present artificial images that depict objects in a virtual environment. The display may display virtual objects or combine real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example optical see-through AR system may use a waveguide-based optical display, where light of projected images may be coupled into a waveguide (e.g., a substrate), propagate within the waveguide, and be coupled out of the waveguide at different locations. In some implementations, the light may be coupled out of the waveguide using a diffractive optical element, such as a grating. The grating may diffract both the light of the projected image and light from the surrounding environment (e.g., from a light source, such as a lamp). The diffracted light from the surrounding environment may appear as a ghost image to the user of the AR system. In addition, due to the wavelength dependent characteristics of the grating, ghost images of different colors may appear at different locations or angles. These ghost images may negatively impact the user experience of using an artificial reality system.

SUMMARY

This disclosure relates generally to near-eye display systems, and more specifically to waveguide displays with reduced glare or ghost images.

In some embodiments, a waveguide display includes a substrate having two opposite surfaces, and a slanted grating at a first surface of the two opposite surfaces of the substrate. The slanted grating includes a plurality of ridges and is characterized by a grating period in one direction. The plurality of ridges is tilted at a slant angle with respect to a surface normal of the first surface and is characterized by a height. The height of the plurality of ridges, the grating period, and the slant angle are configured to cause destructive interference between ambient light diffracted by the slanted grating. In some embodiments, a difference between the height of the plurality of ridges and an integer multiple of the grating period divided by the tangent of the slant angle is less than a threshold value. In some embodiments, a difference between the height of the plurality of ridges and the grating period divided by the tangent of the slant angle is less than a threshold value. In some embodiments, the threshold value is equal to or less than 10% of the height of the plurality of ridges. In some embodiments, the slant angle is greater than 50 degrees. In some embodiments, the slanted grating comprises a two-dimensional grating.

In some embodiments, the waveguide display also includes an anti-reflective coating on a second surface of the two opposite surfaces of the substrate. In some embodiments, the waveguide display includes an anti-reflective coating on a surface of the slanted grating opposite to the first surface of the two opposite surfaces of the substrate. In some embodiments, the waveguide display includes an over-coat layer on a surface of the slanted grating opposite to the first surface of the two opposite surfaces of the substrate.

In some embodiments of the waveguide display, the slanted grating includes a surface-relief grating. In some embodiments, the substrate is configured to reflect display light at the two opposite surfaces by total internal reflection, and the slanted grating is arranged with respect to the substrate to reflectively diffract the display light and transmissively diffract the ambient light from an environment in front of the waveguide display. In some embodiments, the substrate is configured to reflect display light at the two opposite surfaces by total internal reflection, and the slanted grating is arranged with respect to the substrate to transmissively diffract the display light and the ambient light from an environment in front of the waveguide display.

In some embodiments, a grating coupler includes a slanted grating characterized by a grating period. The slanted grating includes a plurality of slanted ridges. The plurality of slanted ridges is characterized by a height and a slant angle with respect to a surface normal of the slanted grating. A difference between the height of the plurality of slanted ridges and an integer multiple of the grating period divided by the tangent of the slant angle is less than a threshold value. In some embodiments, the height of the plurality of slanted ridges is equal to the grating period divided by the tangent of the slant angle. In some embodiments, the grating coupler also includes an over-coat layer on the slanted grating, where the over-coat layer fills gaps between the plurality of slanted ridges and a refractive index of the over-coat layer is different from a refractive index of the plurality of slanted ridges.

In some embodiments, an optical element includes a slanted grating configured to destructively interfere at least a portion of ambient light diffracted by the slanted grating.

In some embodiments, a near-eye display includes an image source, a waveguide, an input coupler configured to couple display light from the image source into the waveguide, and an output coupler coupled to the waveguide. The output coupler is configured to transmit ambient light from an environment in front of the near-eye display and couple the display light out of the waveguide. The output coupler includes a slanted grating characterized by a grating period, the slanted grating including a plurality of slanted ridges. The plurality of slanted ridges is characterized by a height and a slant angle with respect to a surface normal of the slanted grating. A difference between the height of the plurality of slanted ridges and an integer multiple of the grating period divided by the tangent of the slant angle is less than a threshold value.

In some embodiments, the near-eye display includes an anti-reflective coating on a surface of the waveguide opposite to the output coupler. In some embodiments, the near-eye display includes an anti-reflective coating on a surface of the output coupler opposite to the waveguide. In some embodiments, the output coupler includes an over-coat layer on the slanted grating, where the over-coat layer fills gaps between the plurality of slanted ridges and a refractive index of the over-coat layer is different from a refractive index of the plurality of slanted ridges.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 20A-20E illustrate an example process for fabricating a slanted surface-relief grating by slanted etching according to certain embodiments.

FIGS. 22A-22H illustrate example processes for fabricating an NIL mold for use in molding slanted surface-relief gratings according to certain embodiments.

FIGS. 24A-24D illustrate an example process for fabricating a soft stamp used to make a slanted surface-relief grating according to certain embodiments.

FIGS. 25A-25D illustrate an example process for fabricating a slanted surface-relief grating using a soft stamp according to certain embodiments.

Figure 1:
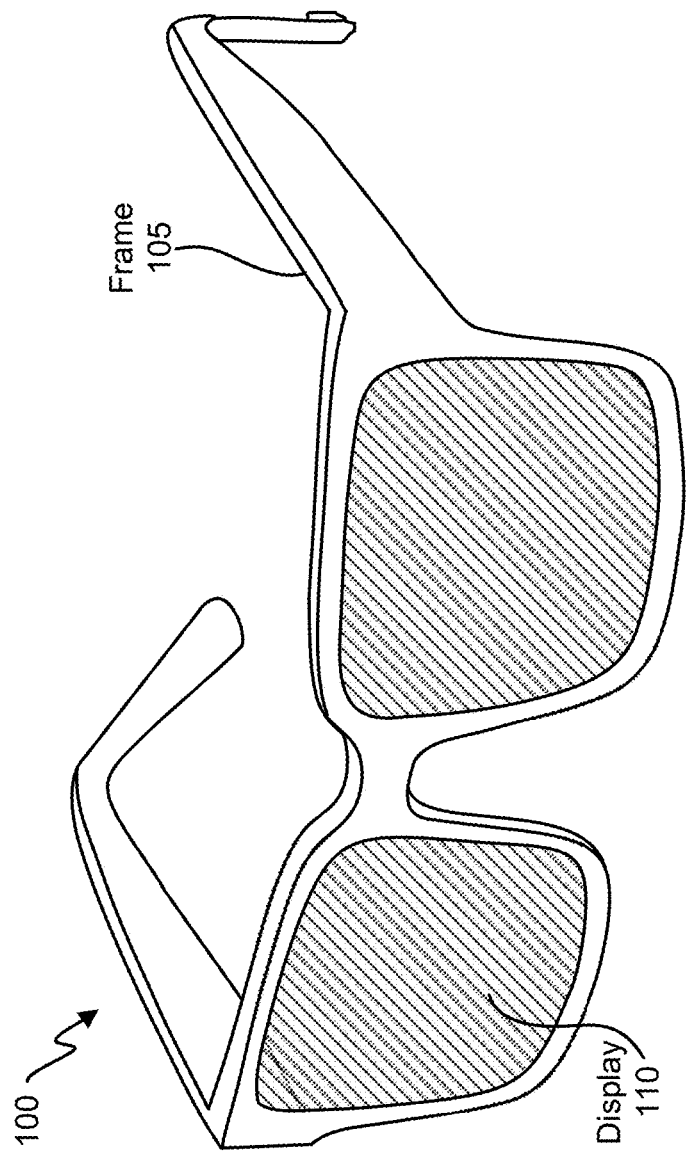
FIG. 1 is a simplified diagram of an example near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to diffraction gratings, and more specifically, to diffraction grating couplers with reduced artifacts (e.g., ghost images and chromatic dispersion) for external light for use in waveguide displays of artificial reality systems. For example, in some embodiments, a slanted grating including a plurality of slanted ridges may be used as the grating coupler for coupling display light of artificial objects out of a waveguide of the waveguide display and for coupling environmental light from real objects into the waveguide. The height of the slanted ridges may be equal to or close to an integer multiple of the period of the slanted grating divided by the tangent of the slant angle of the slanted ridges. In some implementations, an anti-reflective coating may be used to reduce the reflection of the external light at a surface of the waveguide or the grating coupler, such that artifacts caused by the external light reflected back to the grating coupler and diffracted by the grating coupler may be reduced.

In one example, the height and slant angle of the slanted ridges of the slanted grating may be designed so that the height of the grating is equal to or close to the period of the slanted grating divided by the tangent of the slant angle of the slanted ridges. In other words, a top left (or right) point on a first ridge of the slanted grating may be vertically aligned with a bottom left (or right) point of a second ridge of the slanted grating. Thus, the slanted grating may include two overlapped slanted gratings with an offset of about a half of the grating period between the two slanted gratings. As a result, external light diffracted by the two offset slanted gratings (e.g., the −1st order diffraction) may be out of phase by about 180° and thus may destructively interfere with each other, such that most of the external light may enter the waveguide as the $0^{th}$ order diffraction, which may not be wavelength dependent. In this way, the artifacts caused by the −1st order diffraction of the external light by the grating coupler may be reduced or eliminated. Thus, the efficiency of the −1st order transmissive diffraction of the grating coupler for the external light may be much lower than that of the −1st order reflective diffraction of the grating coupler for the display light.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

FIG. 1 is a simplified diagram of an example near-eye display 100 according to certain embodiments. Near-eye display 100 may present media to a user. Examples of media presented by near-eye display 100 may include one or more images, video, and/or audio. In some embodiments, audio may be presented via an external device (e.g., speakers and/or headphones) that receives audio information from near-eye display 100, a console, or both, and presents audio data based on the audio information. Near-eye display 100 is generally configured to operate as an artificial reality display. In some embodiments, near-eye display 100 may operate as an augmented reality (AR) display or a mixed reality (MR) display.

Near-eye display 100 may include a frame 105 and a display 110. Frame 105 may be coupled to one or more optical elements. Display 110 may be configured for the user to see content presented by near-eye display 100. In some embodiments, display 110 may include a waveguide display assembly for directing light from one or more images to an eye of the user.

Figure 2:
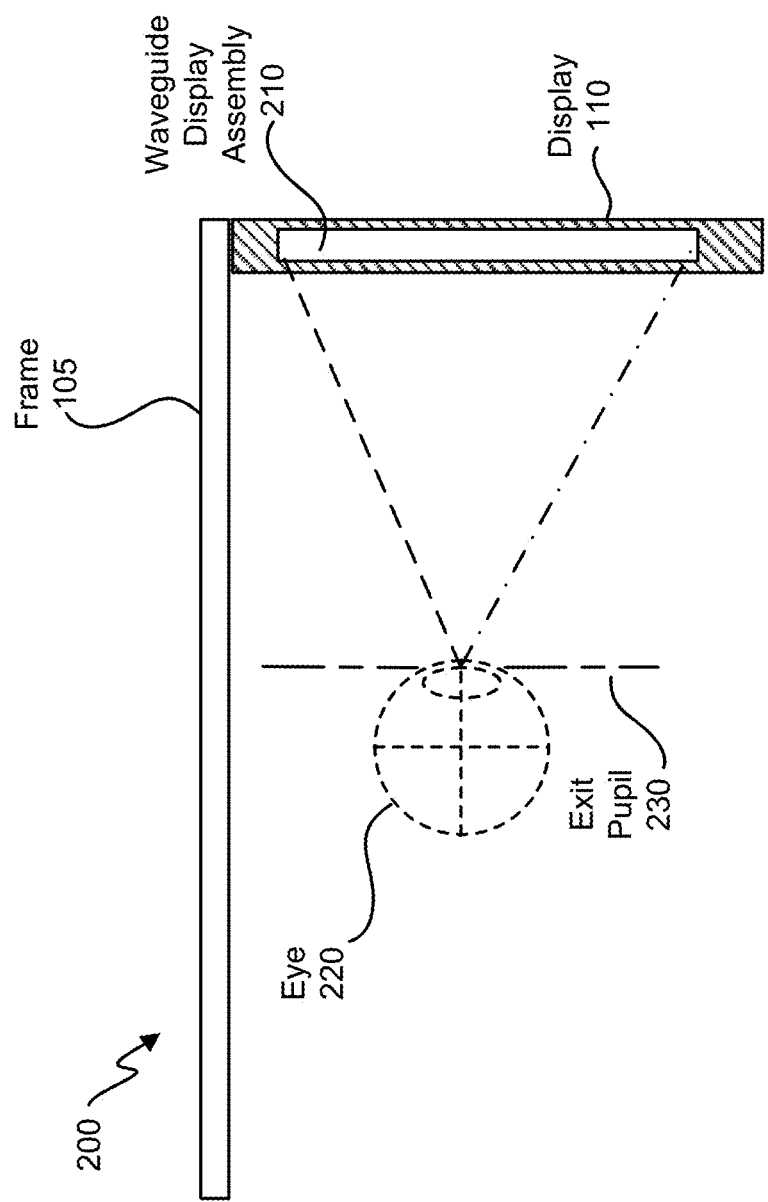
FIG. 2 is a cross-sectional view of an example near-eye display according to certain embodiments.

FIG. 2 is a cross-sectional view 200 of near-eye display 100 illustrated in FIG. 1. Display 110 may include may include at least one waveguide display assembly 210. An exit pupil 230 may be located at a location where a user's eye 220 is positioned when the user wears near-eye display 100. For purposes of illustration, FIG. 2 shows cross-section sectional view 200 associated with user's eye 220 and a single waveguide display assembly 210, but, in some embodiments, a second waveguide display may be used for the second eye of the user.

Waveguide display assembly 210 may be configured to direct image light (i.e., display light) to an eyebox located at exit pupil 230 and to user's eye 220. Waveguide display assembly 210 may include one or more materials (e.g., plastic, glass, etc.) with one or more refractive indices. In some embodiments, near-eye display 100 may include one or more optical elements between waveguide display assembly 210 and user's eye 220.

In some embodiments, waveguide display assembly 210 may include a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
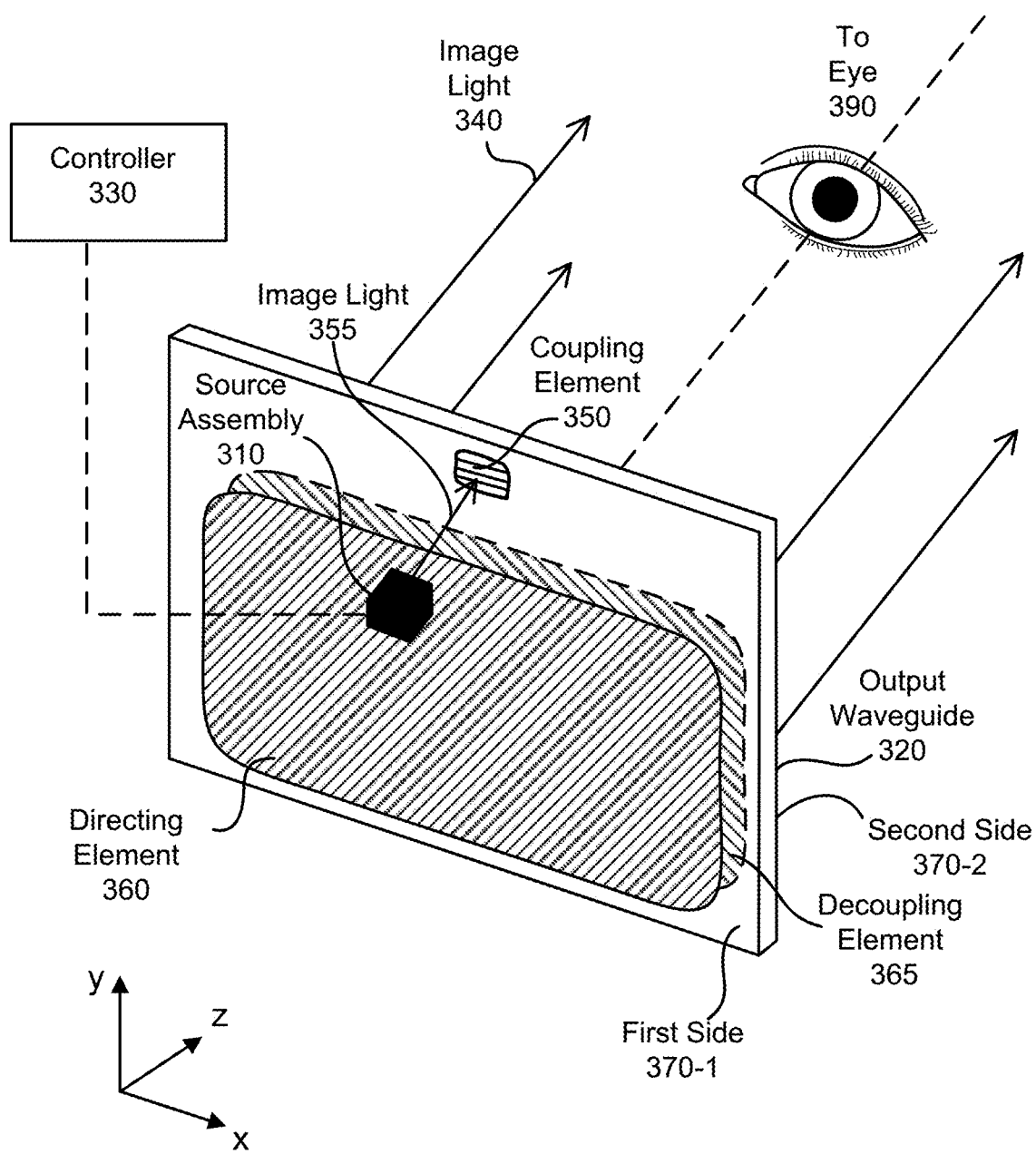
FIG. 3 is an isometric view of an example waveguide display according to certain embodiments.

FIG. 3 is an isometric view of an embodiment of a waveguide display 300. In some embodiments, waveguide display 300 may be a component (e.g., waveguide display assembly 210) of near-eye display 100. In some embodiments, waveguide display 300 may be part of some other near-eye displays or other systems that may direct image light to a particular location.

Waveguide display 300 may include a source assembly 310, an output waveguide 320, and a controller 330. For purposes of illustration, FIG. 3 shows waveguide display 300 associated with a user's eye 390, but in some embodiments, another waveguide display separate, or partially separate, from waveguide display 300 may provide image light to another eye of the user.

Source assembly 310 may generate image light 355 for display to the user. Source assembly 310 may generate and output image light 355 to a coupling element 350 located on a first side 370-1 of output waveguide 320. In some embodiments, coupling element 350 may couple image light 355 from source assembly 310 into output waveguide 320. Coupling element 350 may include, for example, a diffraction grating, a holographic grating, one or more cascaded reflectors, one or more prismatic surface elements, and/or an array of holographic reflectors. Output waveguide 320 may be an optical waveguide that can output expanded image light 340 to user's eye 390. Output waveguide 320 may receive image light 355 at one or more coupling elements 350 located on first side 370-1 and guide received image light 355 to a directing element 360.

Directing element 360 may redirect received input image light 355 to decoupling element 365 such that received input image light 355 may be coupled out of output waveguide 320 via decoupling element 365. Directing element 360 may be part of, or affixed to, first side 370-1 of output waveguide 320. Decoupling element 365 may be part of, or affixed to, a second side 370-2 of output waveguide 320, such that directing element 360 is opposed to decoupling element 365. Directing element 360 and/or decoupling element 365 may include, for example, a diffraction grating, a holographic grating, a surface-relief grating, one or more cascaded reflectors, one or more prismatic surface elements, and/or an array of holographic reflectors.

Second side 370-2 of output waveguide 320 may represent a plane along an x-dimension and a y-dimension. Output waveguide 320 may include one or more materials that can facilitate total internal reflection of image light 355. Output waveguide 320 may include, for example, silicon, plastic, glass, and/or polymers. Output waveguide 320 may have a relatively small form factor. For example, output waveguide 320 may be approximately 50 mm wide along the x-dimension, about 30 mm long along the y-dimension, and about 0.5 to 1 mm thick along a z-dimension.

Controller 330 may control scanning operations of source assembly 310. Controller 330 may determine scanning instructions for source assembly 310. In some embodiments, output waveguide 320 may output expanded image light 340 to user's eye 390 with a large field of view (FOV). For example, expanded image light 340 provided to user's eye 390 may have a diagonal FOV (in x and y) of about 60 degrees or greater and/or about 150 degrees or less. Output waveguide 320 may be configured to provide an eyebox with a length of about 20 mm or greater and/or equal to or less than about 50 mm, and/or a width of about 10 mm or greater and/or equal to or less than about 50 mm.

Figure 4:
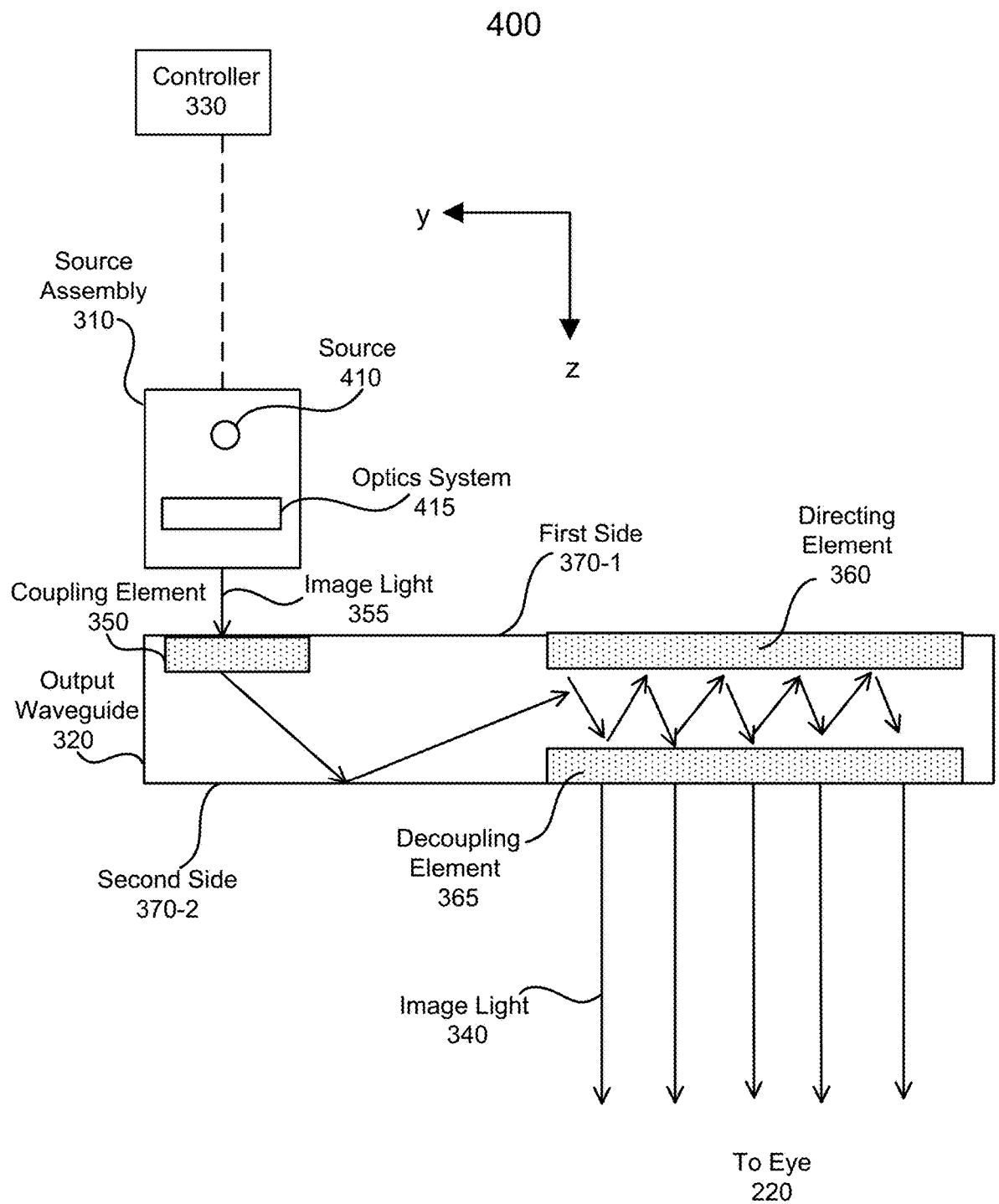
FIG. 4 is a cross-sectional view of an example waveguide display according to certain embodiments.

FIG. 4 is a cross-sectional view 400 of the waveguide display 300. Waveguide display 300 may include source assembly 310 and output waveguide 320. Source assembly 310 may generate image light 355 (i.e., display light) in accordance with scanning instructions from controller 330. Source assembly 310 may include a source 410 and an optics system 415. Source 410 may include a light source that generates coherent or partially coherent light. Source 410 may include, for example, a laser diode, a vertical cavity surface emitting laser, and/or a light emitting diode.

Optics system 415 may include one or more optical components that can condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. Light emitted from optics system 415 (and also source assembly 310) may be referred to as image light 355 or display light.

Output waveguide 320 may receive image light 355 from source assembly 310.

Coupling element 350 may couple image light 355 from source assembly 310 into output waveguide 320. In embodiments where coupling element 350 includes a diffraction grating, the diffraction grating may be configured such that total internal reflection may occur within output waveguide 320, and thus image light 355 coupled into output waveguide 320 may propagate internally within output waveguide 320 (e.g., by total internal reflection) toward decoupling element 365.

Directing element 360 may redirect image light 355 toward decoupling element 365 for coupling at least a portion of the image light out of output waveguide 320. In embodiments where directing element 360 is a diffraction grating, the diffraction grating may be configured to cause incident image light 355 to exit output waveguide 320 at angle(s) of inclination relative to a surface of decoupling element 365. In some embodiments, directing element 360 and/or the decoupling element 365 may be structurally similar, and may switch their roles for different portions of image light 355.

Expanded image light 340 exiting output waveguide 320 may be expanded along one or more dimensions (e.g., elongated along the x-dimension). In some embodiments, waveguide display 300 may include a plurality of source assemblies 310 and a plurality of output waveguides 320. Each of source assemblies 310 may emit a monochromatic image light corresponding to a primary color (e.g., red, green, or blue). Each of output waveguides 320 may be stacked together to output an expanded image light 340 that may be multi-colored.

Figure 5:
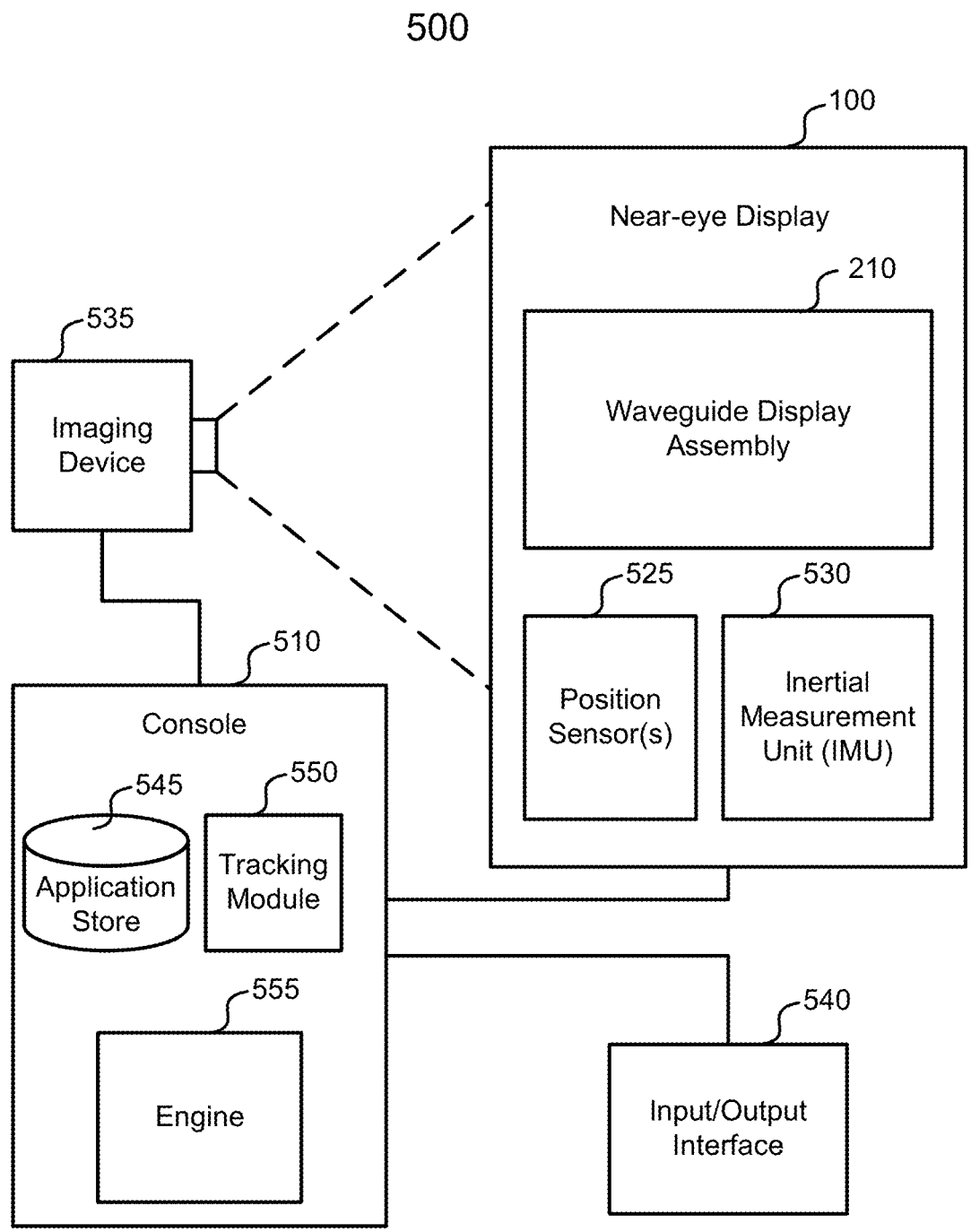
FIG. 5 is a simplified block diagram of an example artificial reality system including a waveguide display.

FIG. 5 is a simplified block diagram of an example artificial reality system 500 including waveguide display assembly 210. System 500 may include near-eye display 100, an imaging device 535, and an input/output interface 540 that are each coupled to a console 510.

As described above, near-eye display 100 may be a display that presents media to a user. Examples of media presented by near-eye display 100 may include one or more images, video, and/or audio. In some embodiments, audio may be presented via an external device (e.g., speakers and/or headphones) that may receive audio information from near-eye display 100 and/or console 510 and present audio data based on the audio information to a user. In some embodiments, near-eye display 100 may act as an artificial reality eyewear glass. For example, in some embodiments, near-eye display 100 may augment views of a physical, real-world environment, with computer-generated elements (e.g., images, video, sound, etc.).

Near-eye display 100 may include waveguide display assembly 210, one or more position sensors 525, and/or an inertial measurement unit (IMU) 530. Waveguide display assembly 210 may include source assembly 310, output waveguide 320, and controller 330, as described above.

IMU 530 may include an electronic device that can generate fast calibration data indicating an estimated position of near-eye display 100 relative to an initial position of near-eye display 100 based on measurement signals received from one or more position sensors 525.

Imaging device 535 may generate slow calibration data in accordance with calibration parameters received from console 510. Imaging device 535 may include one or more cameras and/or one or more video cameras.

Input/output interface 540 may be a device that allows a user to send action requests to console 510. An action request may be a request to perform a particular action. For example, an action request may be to start or end an application or to perform a particular action within the application.

Console 510 may provide media to near-eye display 100 for presentation to the user in accordance with information received from one or more of: imaging device 535, near-eye display 100, and input/output interface 540. In the example shown in FIG. 5, console 510 may include an application store 545, a tracking module 550, and an engine 555.

Application store 545 may store one or more applications for execution by the console 510. An application may include a group of instructions that, when executed by a processor, may generate content for presentation to the user. Examples of applications may include gaming applications, conferencing applications, video playback application, or other suitable applications.

Tracking module 550 may calibrate system 500 using one or more calibration parameters and may adjust one or more calibration parameters to reduce error in determination of the position of near-eye display 100. Tracking module 550 may track movements of near-eye display 100 using slow calibration information from imaging device 535. Tracking module 550 may also determine positions of a reference point of near-eye display 100 using position information from the fast calibration information.

Engine 555 may execute applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210. The signal may determine a type of content to present to the user.

There may be many different ways to implement the waveguide display. For example, in some implementations, output waveguide 320 may include a slanted surface between first side 370-1 and second side 370-2 for coupling image light 355 into output waveguide 320. In some implementations, the slanted surface may be coated with a reflective coating to reflect light towards directing element 360. In some implementations, the angle of the slanted surface may be configured such that image light 355 may be reflected by the slanted surface due to total internal reflection. In some implementations, directing element 360 may not be used, and light may be guided within output waveguide 320 by total internal reflection. In some implementations, decoupling elements 365 may be located near first side 370-1.

In some implementations, output waveguide 320 and decoupling element 365 (and directing element 360 if used) may be transparent to light from the environment, and may act as an optical combiner to combine image light 355 and light from the physical, real-world environment in front of near-eye display 100. As such, the user can view both artificial images of artificial objects from source assembly 310 and real images of real objects in the physical, real-world environment.

Figure 6:
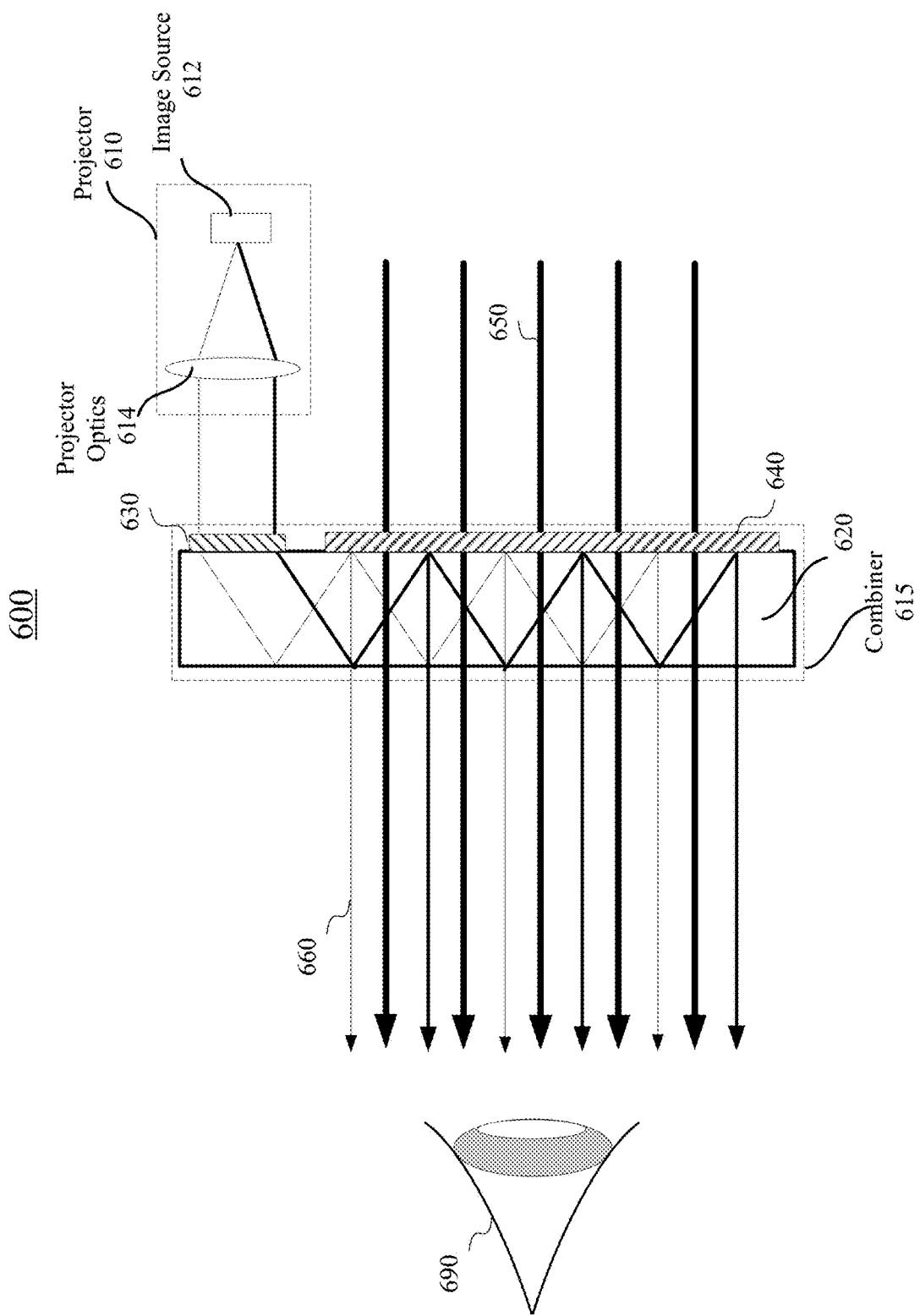
FIG. 6 illustrates an example optical see-through augmented reality system using a waveguide display according to certain embodiments.

FIG. 6 illustrates an example optical see-through augmented reality system 600 using a waveguide display according to certain embodiments. Augmented reality system 600 may include a projector 610 and a combiner 615. Projector 610 may include a light source or image source 612 and projector optics 614. In some embodiments, image source 612 may include a plurality of pixels that displays virtual objects, such as an LCD display panel or an LED display panel. In some embodiments, image source 612 may include a light source that generates coherent or partially coherent light. For example, image source 612 may include a laser diode, a vertical cavity surface emitting laser, and/or a light emitting diode. In some embodiments, image source 612 may include a plurality of light sources each emitting a monochromatic image light corresponding to a primary color (e.g., red, green, or blue). In some embodiments, image source 612 may include an optical pattern generator, such as a spatial light modulator. Projector optics 614 may include one or more optical components that can condition the light from image source 612, such as expanding, collimating, scanning, or projecting light from image source 612 to combiner 615. The one or more optical components may include one or more lenses, liquid lenses, mirrors, apertures, and/or gratings. In some embodiments, projector optics 614 may include a liquid lens (e.g., a liquid crystal lens) with a plurality of electrodes that allows scanning of the light from image source 612.

Combiner 615 may include an input coupler 630 for coupling light from projector 610 into a substrate 620 of combiner 615. Input coupler 630 may include a volume holographic grating, a DOE (e.g., a surface-relief grating), or a refractive coupler (e.g., a wedge or a prism). Input coupler 630 may have a coupling efficiency of greater than 30%, 50%, 75%, 90%, or higher for visible light. As used herein, visible light may refer to light with a wavelength between about 380 nm to about 750 nm. Light coupled into substrate 620 may propagate within substrate 620 through, for example, total internal reflection (TIR). Substrate 620 may be in the form of a lens of a pair of eyeglasses. Substrate 620 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 620 may be transparent to visible light. A material may be "transparent" to a light beam if the light beam can pass through the material with a high transmission rate, such as larger than 60%, 75%, 80%, 90%, 95%, or higher, where a small portion of the light beam (e.g., less than 60%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 620 may include a plurality of output couplers 640 configured to extract at least a portion of the light guided by and propagating within substrate 620 from substrate 620 and direct extracted light 660 to an eye 690 of the user of augmented reality system 600. As input coupler 630, output couplers 640 may include grating couplers (e.g., volume holographic gratings or surface-relief gratings), prisms, or DOEs. Output couplers 640 may have different coupling (e.g., diffraction) efficiencies at different locations. Substrate 620 may also allow light 650 from environment in front of combiner 615 to pass through with little or no loss. Output couplers 640 may allow light 650 to pass through with little loss. For example, in some implementations, output couplers 640 may have a low diffraction efficiency for light 650 as described below such that light 650 may be refracted or otherwise pass through output couplers 640 with little loss. In some implementations, output couplers 640 may have a high diffraction efficiency for light 650 and may direct light 650 to certain desired directions (i.e., diffraction angles) with little loss. As a result, the user may be able to view combined images of the environment in front of combiner 615 and virtual objects projected by projector 610.

Figure 7:
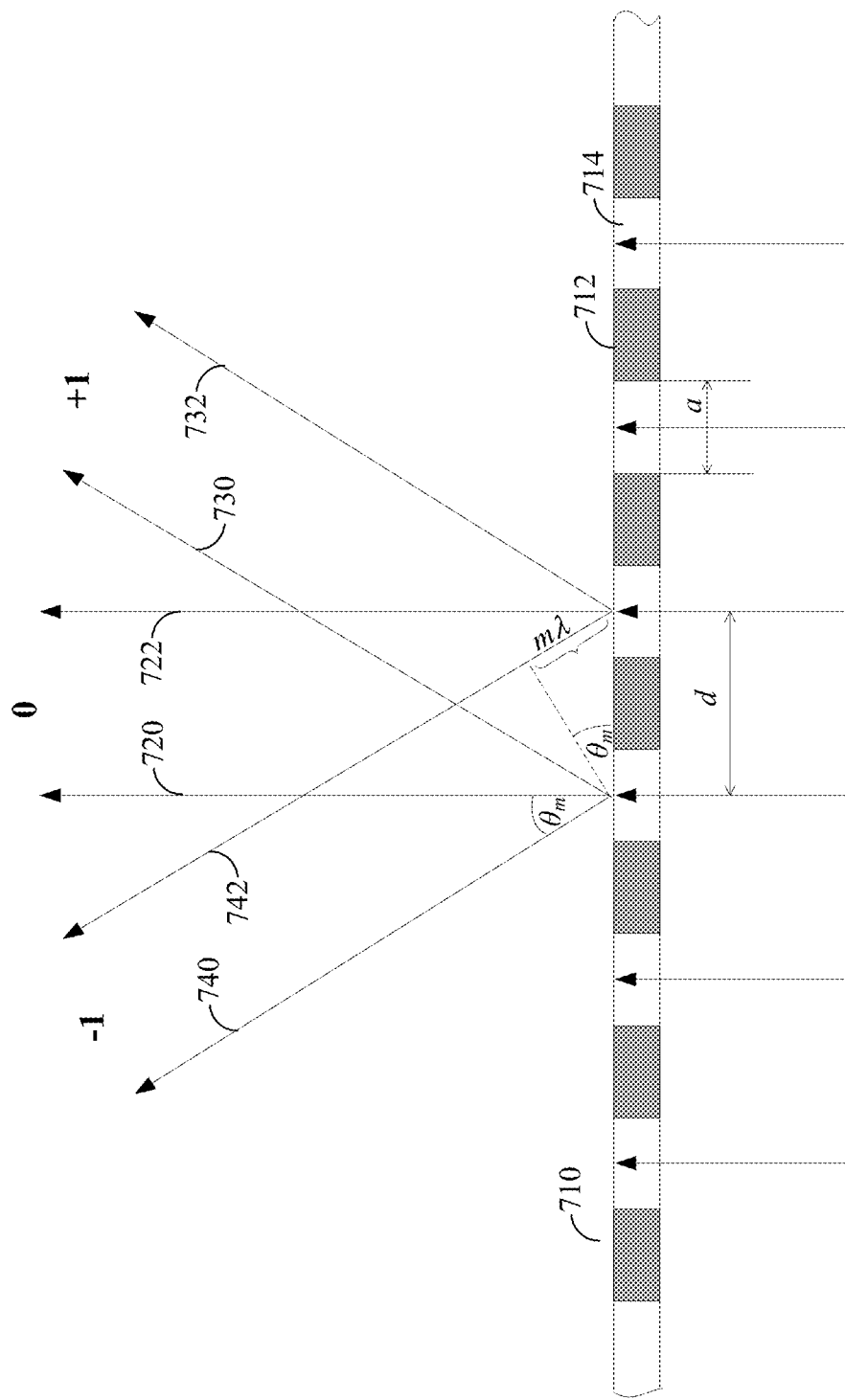
FIG. 7 illustrates example optical diffractions by an example one-dimensional grating.

FIG. 7 illustrates optical diffractions by an example one-dimensional optical grating 710. A diffraction grating may include a quasi-one dimensional structure including a series of parallel slits, notches, lines, steps, etc. (which may be referred to as grating grooves). In the example, one-dimensional optical grating 710 may be a transmission grating with multiple grooves 712, where each groove 712 may have a length d and may include a slit 714 with a width a. According to the Huygens-Fresnel principle, when a plane wave is incident on the grating, each groove 712 (or slit 714) may act like a point source, emitting a spherical wave (or more accurately, a cylindrical wave). The wavefront of the propagating wave at any subsequent point can be found by summing the contributions from each of these individual point sources. For certain angles, there may be a destructive interference. For some other angles, there may be a constructive interference. The peaks of the constructive interference may be referred to as diffraction orders. The diffraction angle $\theta_m$ for the mth diffraction order of surface-normal incident light may be determined by the following grating equation:

$$d \sin \theta_m = m\lambda,$$

where $\lambda$ is the wavelength of the incident wave. For example, for zero order diffraction (transmission) represented by lines 720 and 722, the diffraction angle is 0. For the +1st diffraction order represented by lines 730 and 732, the diffraction angle is positive (to the right of the zero order). For the −1st diffraction order represented by lines 740 and 742, the diffraction angle is negative (to the left of the zero order). It can be seen from the above grating equation that the diffraction angle θm for the same mth diffraction order is different for light with a different wavelength $\lambda$ (color), which may be referred to as the chromatic dispersion (or simply dispersion) of the grating.

The electrical field of the light diffracted by a grating may also be analyzed using Fourier optics according to, $$o(x) = g(x) \otimes i(x), \text{ or}$$

$$O(f) = G(f) \times i(f),$$

where I(f), G(f), and O(f) are the Fourier transforms of input field i(x), grating function g(x), and output field o(x), respectively.

For example, the intensity of the electrical field of a plane wave at angle θ may be determined by the diffraction by a single slit and the interference by the multiple slits of the grating. For example, when N grooves of the diffraction grating are illuminated by the incident wave, the intensity of the electrical field of the plane wave at angle θ may be determined by:

$$I(\theta) = I_0 \left[ \mathrm{sinc}\left(\frac{\pi a}{\lambda}\sin\theta\right) \right]^2 \left[ \frac{\sin\left(\frac{N\pi d}{\lambda}\sin\theta\right)}{\sin\left(\frac{\pi d}{\lambda}\sin\theta\right)} \right]^2,$$

where the factor $$\left[ \mathrm{sinc}\left(\frac{\pi a}{\lambda}\sin\theta\right) \right]^2$$

represents the diffraction effect of a single slit with a width a, and the factor $$\left[ \frac{\sin\left(\frac{N\pi d}{\lambda}\sin\theta\right)}{\sin\left(\frac{\pi d}{\lambda}\sin\theta\right)} \right]^2$$

represents the interference effect of the N grooves (or slits) of the grating.

Figure 8:
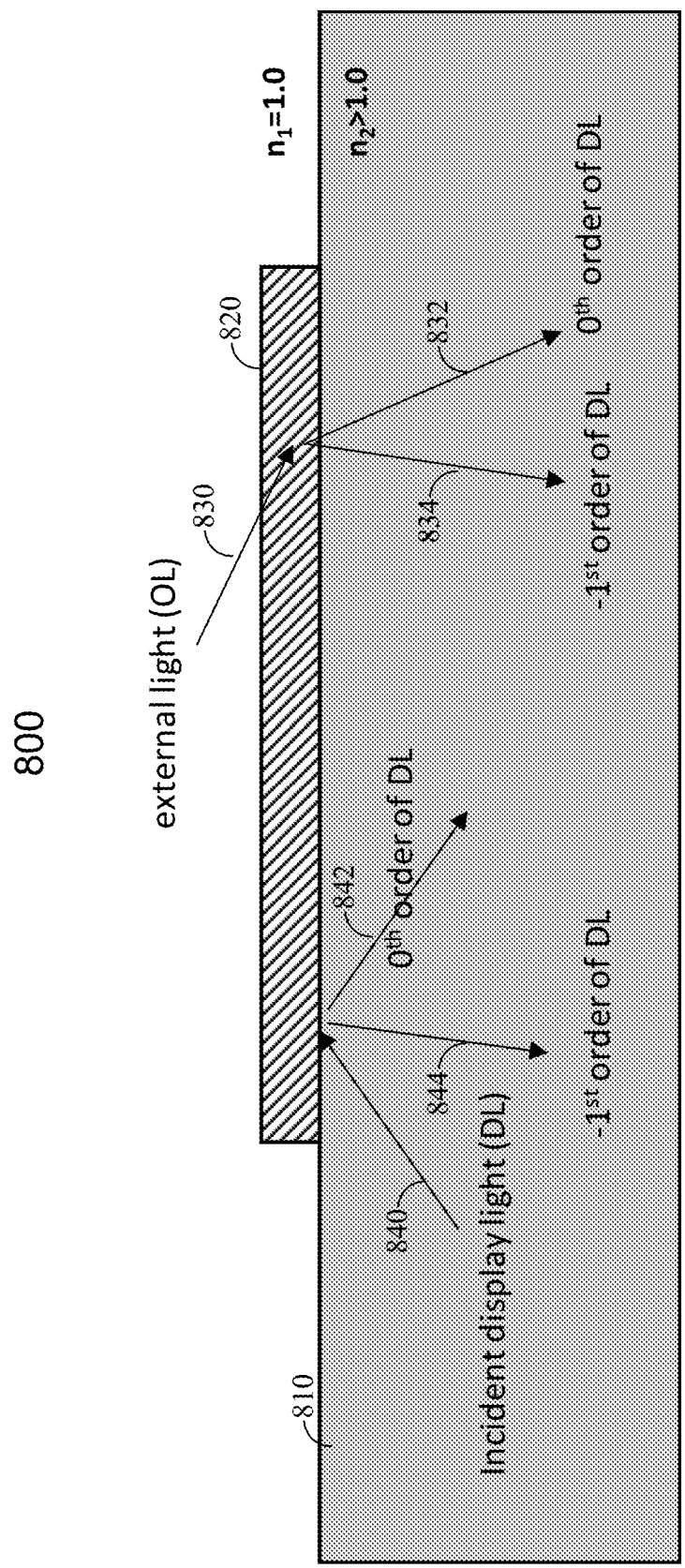
FIG. 8 illustrates propagations of display light and external light in an example waveguide display.

FIG. 8 illustrates propagations of incident display light 840 and external light 830 in an example waveguide display 800 including a waveguide 810 and a grating coupler 820. Waveguide 810 may be a flat or curved transparent substrate with a refractive index $n_2$ greater than the free space refractive index $n_1$ (i.e., 1.0). Grating coupler 820 may be, for example, a Bragg grating or a surface-relief grating.

Incident display light 840 may be coupled into waveguide 810 by, for example, input coupler 630 of FIG. 6 or other couplers (e.g., a prism or slanted surface) described above. Incident display light 840 may propagate within waveguide 810 through, for example, total internal reflection. When incident display light 840 reaches grating coupler 820, incident display light 840 may be diffracted by grating coupler 820 into, for example, a $0^{th}$ order diffraction (i.e., reflection) light 842 and a −1st order diffraction light 844. The $0^{th}$ order diffraction may propagate within waveguide 810, and may be reflected by the bottom surface of waveguide 810 towards grating coupler 820 at a different location. The −1st order diffraction light 844 may be coupled (e.g., refracted) out of waveguide 810 towards the user's eye, because a total internal reflection condition may not be met at the bottom surface of waveguide 810 due to the diffraction angle.

External light 830 may also be diffracted by grating coupler 820 into, for example, a $0^{th}$ order diffraction light 832 and a −1st order diffraction light 834. Both the $0^{th}$ order diffraction light 832 and the −1st order diffraction light 834 may be refracted out of waveguide 810 towards the user's eye. Thus, grating coupler 820 may act as an input coupler for coupling external light 830 into waveguide 810, and may also act as an output coupler for coupling incident display light 840 out of waveguide 810. As such, grating coupler 820 may act as a combiner for combining external light 830 and incident display light 840. In general, the diffraction efficiency of grating coupler 820 (e.g., a surface-relief grating coupler) for external light 830 (i.e., transmissive diffraction) and the diffraction efficiency of grating coupler 820 for incident display light 840 (i.e., reflective diffraction) may be similar or comparable.

Figure 9A:
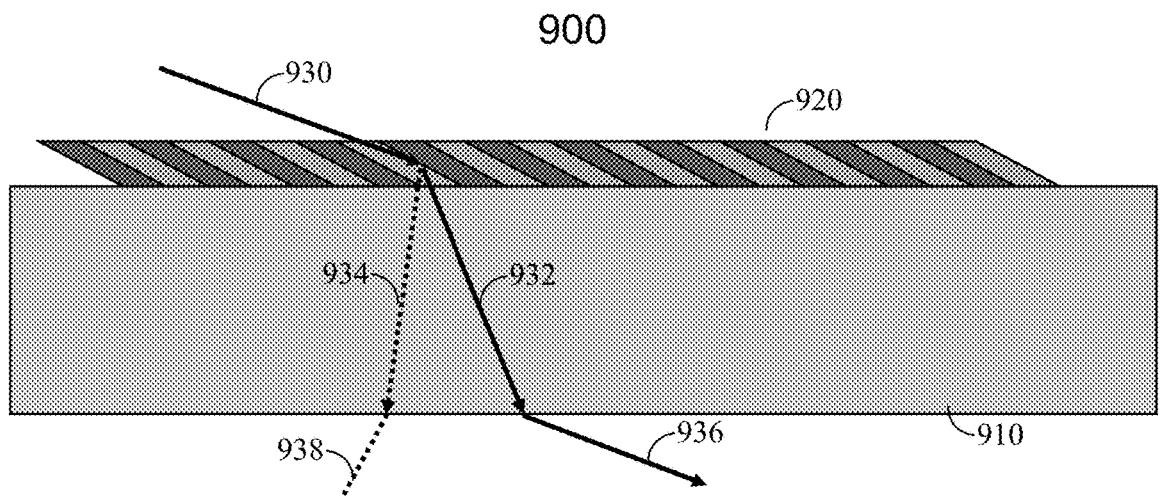
FIG. 9A illustrates the propagation of external light in an example waveguide display with a grating coupler on the front side of the waveguide display.

FIG. 9A illustrates the propagation of external light 930 in an example waveguide display 900 with a grating coupler 920 on the front side of a waveguide 910. As described above, external light 930 may be diffracted by grating coupler 920 into a $0^{th}$ order diffraction light 932 and a −1st order diffraction light 934. The $0^{th}$ order diffraction light 932 may be refracted out of waveguide 910 in a direction shown by light ray 936. The $-1^{st}$ order diffraction light 934 may be refracted out of waveguide 910 in a direction shown by light ray 938. For different wavelengths (colors), the $0^{th}$ order diffraction light may have a same diffraction angle, but the −1st order diffraction light may have different diffraction angles (i.e., wavelength dependent).

Figure 9B:
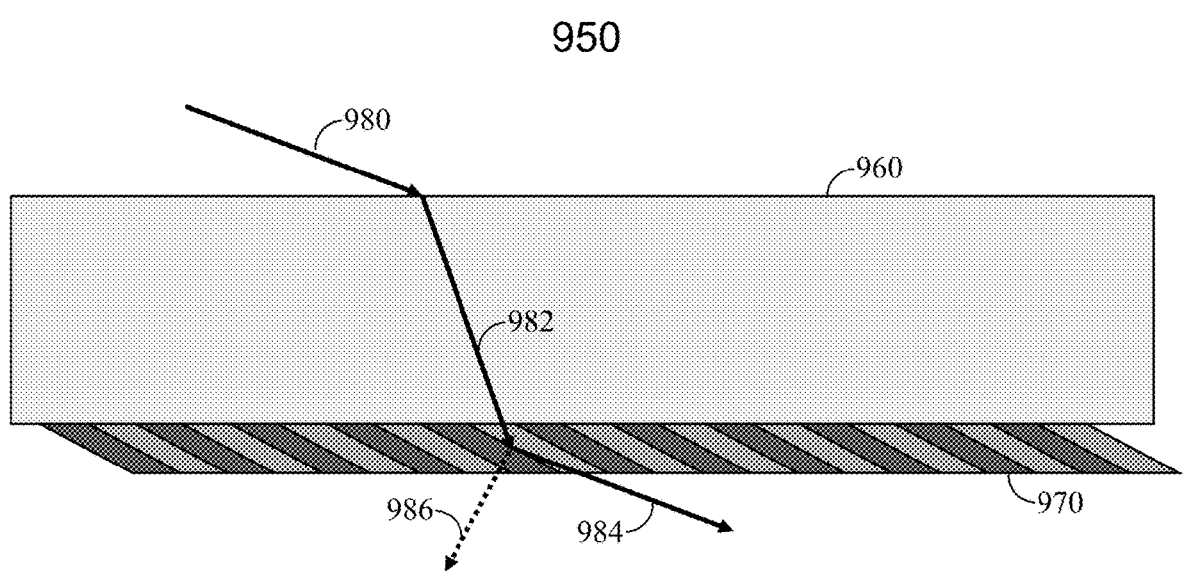
FIG. 9B illustrates the propagation of external light in an example waveguide display with a grating coupler on the back side of the waveguide display.

FIG. 9B illustrates the propagation of external light 980 in an example waveguide display 950 with a grating coupler 970 on the back side of a waveguide 960. External light 980 may be refracted into waveguide 960 as refracted light 982. Refracted light 982 may then be diffracted out of waveguide 960 by grating coupler 970 into a $0^{th}$ order diffraction light 984 and a −1st order diffraction light 986. The propagation direction of the $0^{th}$ order diffraction light 984 may be similar to the propagation direction of light ray 936. The propagation direction of the −1st order diffraction light 986 may be similar to the propagation direction of light ray 938. For different wavelengths (colors), the $0^{th}$ order diffraction light may have a same diffraction angle, but the −1st order diffraction light may have different diffraction angles (i.e., wavelength dependent).

Figure 10:
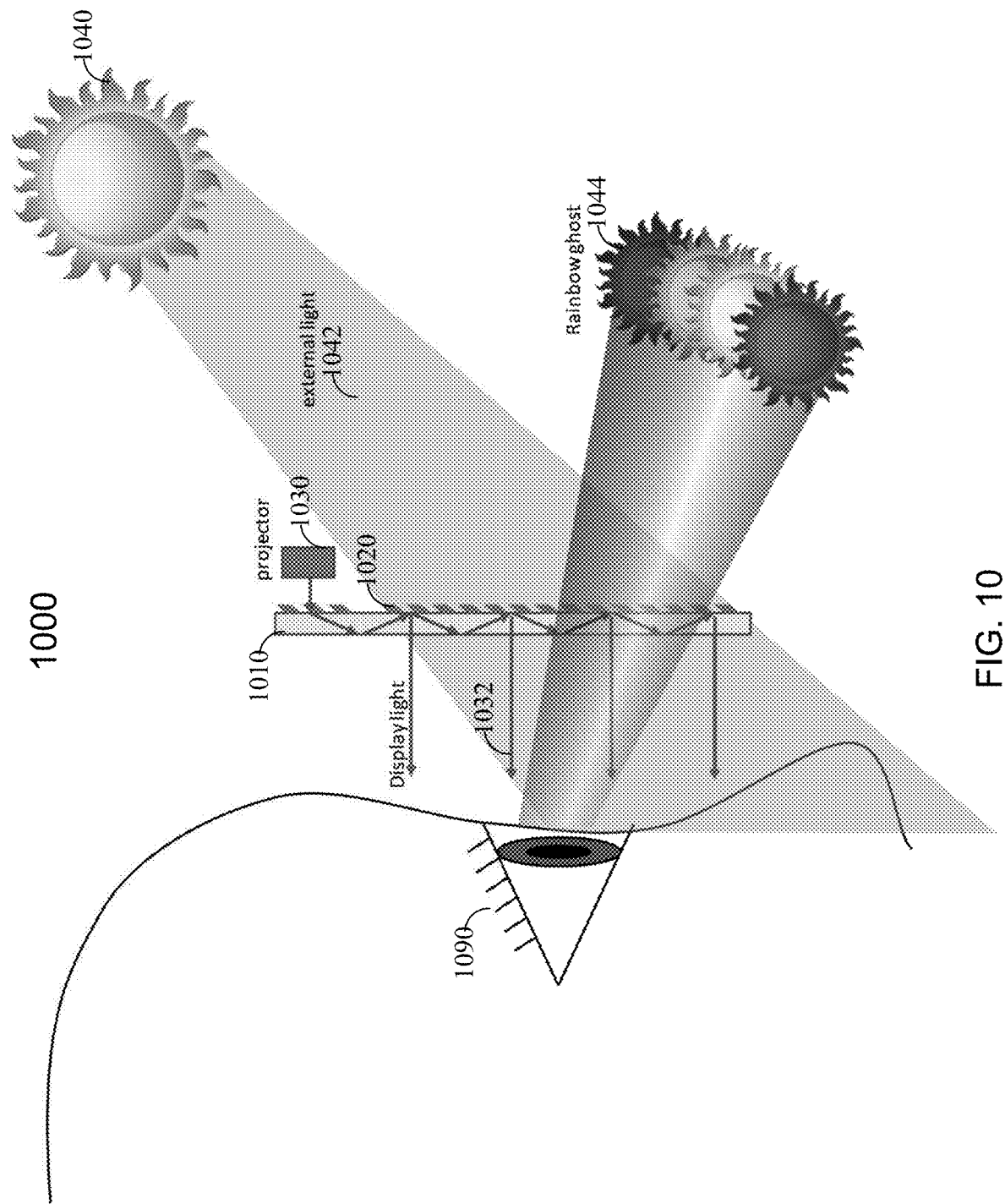
FIG. 10 illustrates rainbow artifacts in an example waveguide display.

FIG. 10 illustrates rainbow artifacts in an example waveguide display 1000. As described above, waveguide display 1000 may include a waveguide 1010, a grating coupler 1020, and a projector 1030. Display light 1032 from projector 1030 may be coupled into waveguide 1010, and may be partially coupled out of waveguide 1010 at different locations by grating coupler 1020 to reach a user's eye 1090. External light 1042 from an external light source 1040, such as the sun or a lamp, may also be diffracted by grating coupler 1020 into waveguide 1010 and may then propagate through waveguide 1010 to reach user's eye 1090.

As described above with respect to FIG. 8 and FIGS. 9A and 9B, the grating coupler may not only diffract the display light, but also diffract the external light. In addition, as described above with respect to FIG. 7, due to the chromatic dispersion of the grating, lights of different colors may be diffracted at different angles for diffractions with a diffraction order greater or less than zero. As such, the −1st order diffractions of external light of different colors that reach the user's eye (e.g., diffraction light 986 or light ray 938) may appear as ghost images located at different locations (or directions), which may be referred to as a rainbow artifact or rainbow ghost 1044. Rainbow ghost 1044 may appear on top of the displayed image or the image of the environment, and disrupt the displayed image or the image of the environment. Rainbow ghost 1044 may significantly impact the user experience. In some cases, rainbow ghost 1044 may also be dangerous to user's eye 1090 when the light from external light source 1040 (e.g., the sun) is directed to user's eye 1090 with a high efficiency.

Techniques disclosed herein may be used to reduce the rainbow ghost caused by the diffraction of external light by a grating coupler of a waveguide display. For example, in some embodiments, a slanted grating including a plurality of slanted ridges may be used as the grating coupler, wherein a height of the slanted ridges may be equal to or close to an integer multiple of the period of the slanted grating divided by the tangent of the slant angle of the slanted ridges. In one example, the height and slant angle of the slanted ridges of the slanted grating may be designed so that the height of the grating is equal to or close to the period of the slanted grating divided by the tangent of the slant angle of the slanted ridges. In other words, a top left (or right) point on a first ridge of the slanted grating may be vertically aligned with a bottom left (or right) point of a second ridge of the slanted grating. Thus, the slanted grating may be considered as including two overlapped slanted gratings with an offset of about a half of the grating period between the two slanted gratings. As a result, external light diffracted by the two offset slanted gratings (e.g., the −1st order diffraction) may be out of phase by about 180°, and thus may destructively interfere with each other such that most of the external light may enter the waveguide as the $0^{th}$ order diffraction, which may not be wavelength dependent. In this way, the rainbow ghost caused by the −1st order diffraction of external light by the grating coupler may be reduced or eliminated. Thus, the efficiency of the −1st order transmissive diffraction of the grating coupler for the external light can be much lower than that of the −1st order reflective diffraction of the grating coupler for the display light. For example, the efficiency for the −1st order diffraction of the display light may be greater than about 5%, about 20%, about 30%, about 50%, about 75%, about 90%, or higher, while the efficiency for the −1st order diffraction of the external light may be less than about 2%, less than about 1%, less than about 0.5%, or lower. In some implementations, an anti-reflective coating may be used to reduce the reflection of the external light at a surface of the waveguide or the grating coupler, where the external light, if reflected back to the grating coupler and diffracted by the grating coupler, may cause rainbow ghosts and/or other artifacts.

Figure 11A:
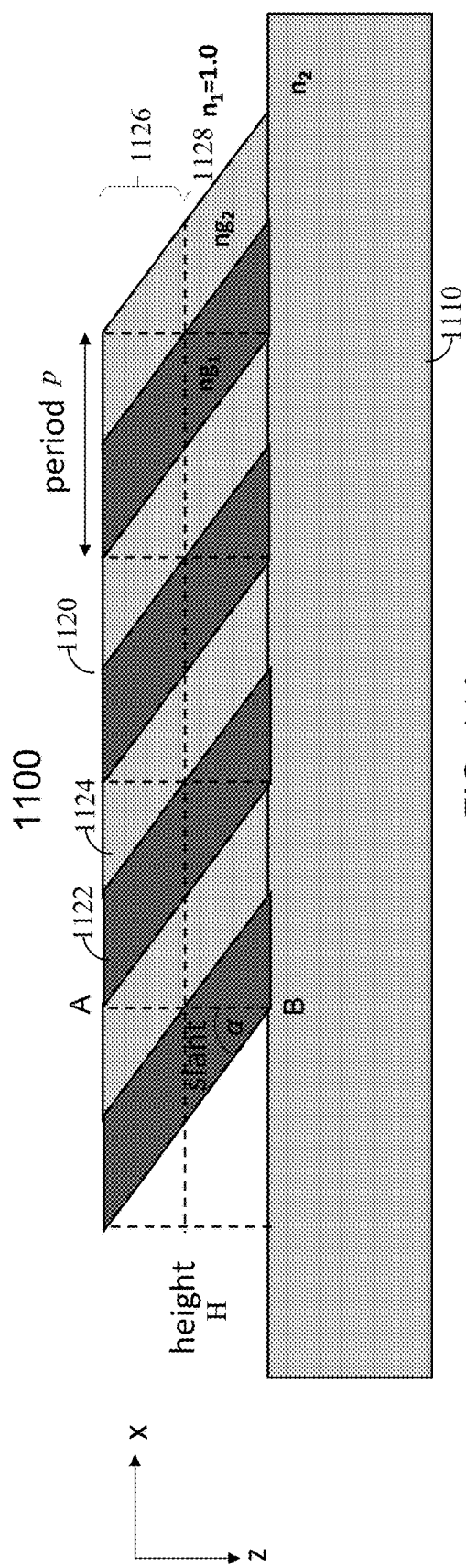
FIG. 11A illustrates an example grating coupler with reduced rainbow artifacts according to certain embodiments.

FIG. 11A illustrates an example grating coupler 1120 of a waveguide display 1100 with reduced rainbow artifacts according to certain embodiments. Grating coupler 1120 may be formed on a waveguide 1110 (e.g., a transparent substrate with a refractive index $n_2$) of waveguide display 1100. Grating coupler 1120 may include a plurality of periods in the x (horizontal) direction. Each period may include a first slant region 1122 formed of a material with a refractive index $n_{g1}$, and a second slant region 1124 formed of a material with a refractive index $n_{g2}$. In various embodiments, the difference between $n_{g1}$ and $n_{g2}$ may be greater than 0.1, 0.2, 0.3, 0.5, 1.0, or higher. In some implementations, one of first slant region 1122 and second slanted region 1124 may be an air gap with a refractive index of about 1.0. First slant region 1122 and second slanted region 1124 may have a slant angle α with respect to the z (vertical) direction. The height (H) of first slant region 1122 and second slanted region 1124 may be equal or close to (e.g., within about 5% or 10% of) an integer multiple (m) of the grating period p divided by the tangent of the slant angle α, i.e., $$H \times \tan(\alpha) \approx m \times p.$$

In the example shown in FIG. 11A, m is equal to 1. Thus, the top left point A of a first slanted region 1122 in a grating period may align vertically with bottom left point B of another first slanted region 1122 in a different grating period. Grating coupler 1120 may thus include a first (top) slanted grating 1126 and a second (bottom) slanted grating 1128 each having a height of H/2. First slanted grating 1126 and a second slanted grating 1128 may be offset from each other in the x direction by p/2.

Figure 11B:
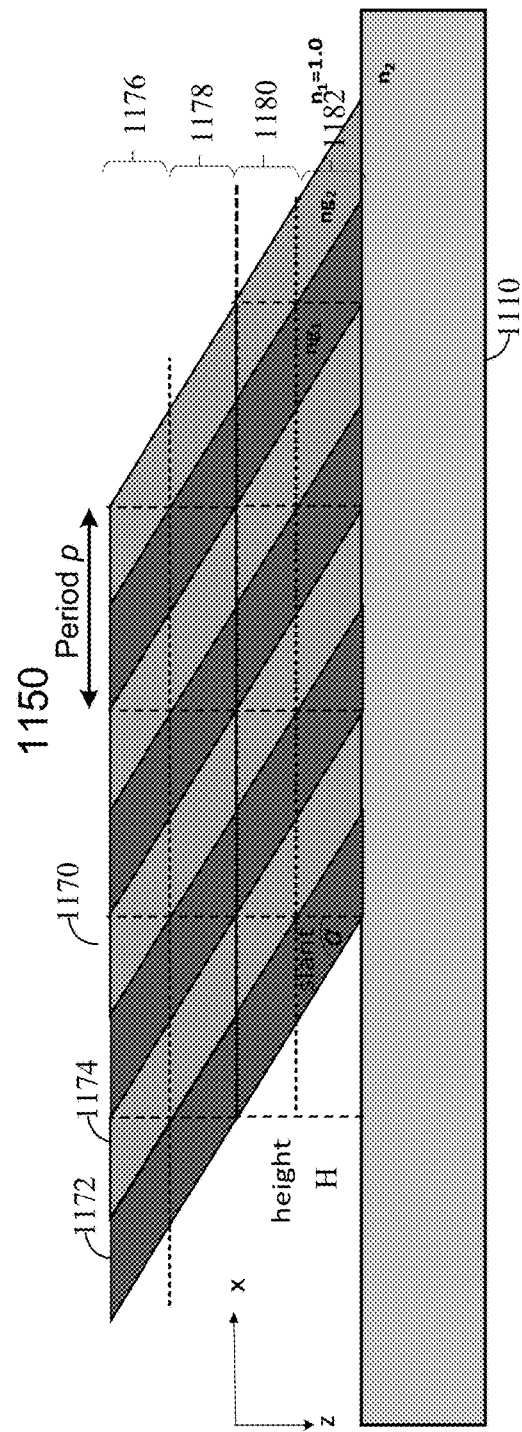
FIG. 11B illustrates another example grating coupler with reduced rainbow artifacts according to certain embodiments.

FIG. 11B illustrates another example grating coupler 1170 of a waveguide display 1150 with reduced rainbow artifacts according to certain embodiments. In the example shown in FIG. 11B, m is equal to 2. Grating coupler 1170 may thus include four overlapped slanted gratings 1176-1182 each having a height of H/4 and offset from each other by a half grating period (p/2) in the x direction.

Figure 12:
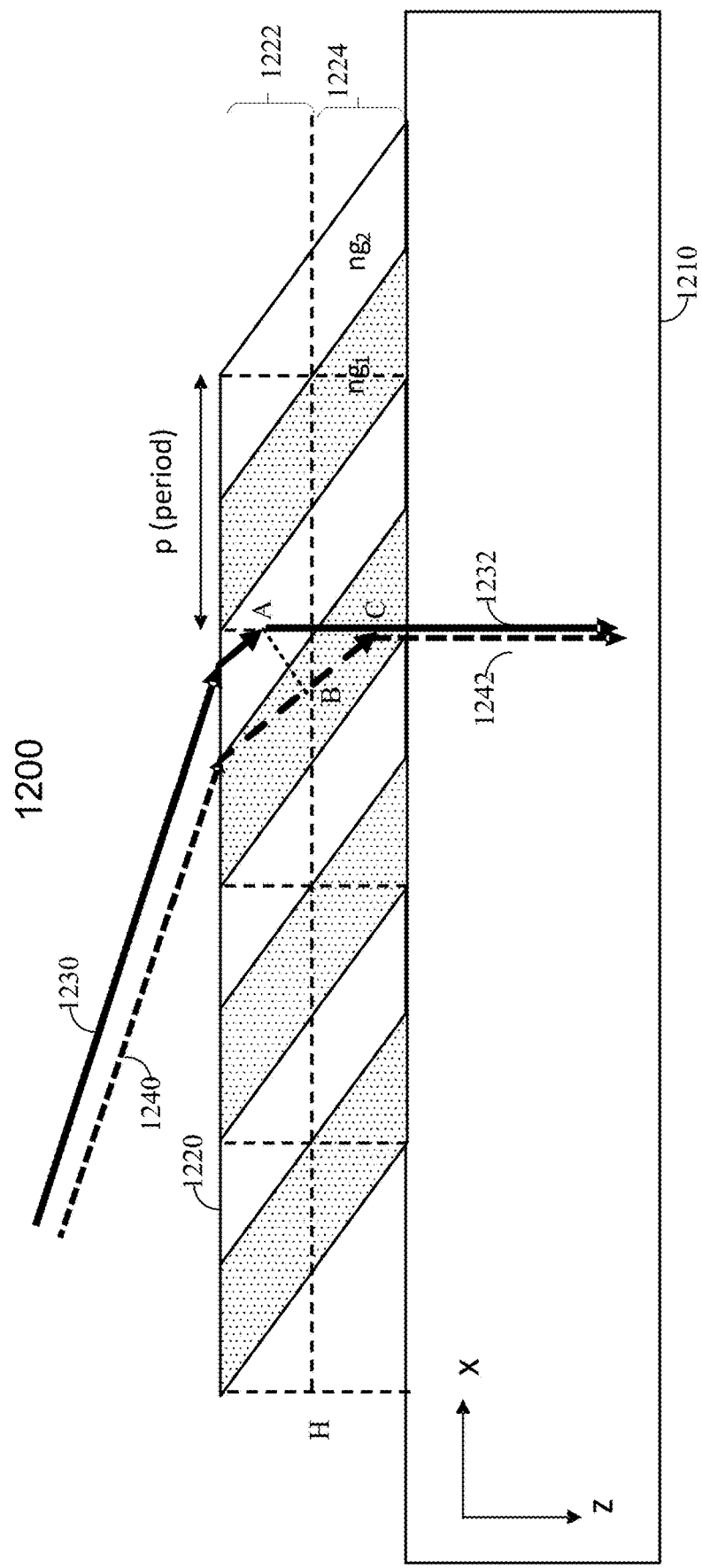
FIG. 12 is a simplified diagram illustrating external light diffraction by a grating coupler in a waveguide display according to certain embodiments.

FIG. 12 is a simplified diagram illustrating external light diffraction (transmissive diffraction) by a grating coupler 1220 in a waveguide display 1200 according to certain embodiments. As waveguide display 950, waveguide display 1200 may include a waveguide 1210 and grating coupler 1220 on one side of waveguide 1210. Grating coupler 1220 may include a first (top) slanted grating 1222 and a second (bottom) slanted grating 1224 each having a height of H/2, where H is the height of grating coupler 1220. First slanted grating 1222 and second slanted grating 1224 may be offset from each other in the x direction by about p/2, where p is the grating period of grating coupler 1220.

External light (e.g., a plane wave) incident on grating coupler 1220 may include a first portion (external light 1230) and a second portion (external light 1240) that may have the same phase. External light 1230 may be refracted into grating coupler 1220 and diffracted by first slanted grating 1222 into a −1st order diffraction light 1232, and external light 1240 may be refracted into grating coupler 1220 and diffracted by second slanted grating 1224 into a −1st order diffraction light 1242. Point A and point B are in phase. Therefore, the phase difference between diffraction light 1232 and diffraction light 1242 may be approximated by:

$$2\pi \frac{OPL_{AC} - OPL_{BC}}{\lambda_0} + \Delta,$$

where $OPL_{AC}$ is the optical length (physical length multiplied by the refractive index) between point A and point C, $OPL_{BC}$ is the optical length between point B and point C, $\lambda_0$ is the wavelength of the external light in free space, and $\Delta$ is the phase difference caused by the diffraction by first slanted grating 1222 and the diffraction by second slanted grating 1224. The difference between $OPL_{AC}$ and $OPL_{BC}$ may be fairly small, and thus the phase difference between diffraction light 1232 and diffraction light 1242 may be close to $\Delta$.

As described above, the electrical field of the light diffracted by a grating may be analyzed using Fourier optics. The Fourier transform of grating function g(x) for first slanted grating 1222 may be:

$$F(g(x)) = G(f).$$

The Fourier transform of the grating function for second slanted grating 1224 may be:

$$F(g(x-a)) = e^{-i2\pi f a} G(f),$$

where a is the offset of second slanted grating 1224 with respect to first slanted grating 1222 in the x direction. Because the spatial frequency f of the grating is equal to 1/p, when a is equal to p/2, $e^{-i2\pi f a}$ becomes $e^{-1\pi}$. As such, the electrical field of the light diffracted by first slanted grating 1222 and the electrical field of the light diffracted by second slanted grating 1224 may be out of phase by about 180° (or $\pi$). Therefore, $\Delta$ may be equal to about $\pi$. Because the optical path difference between $OPL_{AC}$ and $OPL_{BC}$ is fairly small, $$2\pi \frac{OPL_{AC} - OPL_{BC}}{\lambda_0} + \Delta$$

may be close to $\pi$ to cause at least partial destructive interference between diffraction light 1232 and diffraction light 1242.

To further reduce the overall $-1^{st}$ order diffraction of external light by grating coupler 1220, it is desirable that the phase difference between diffraction light 1232 and diffraction light 1242 is about 180° (or $\pi$), such that diffraction light 1232 and diffraction light 1242 can destructively interfere to cancel each other. In some embodiments, the height, period, and/or slant angle of grating coupler 1220 may be adjusted such that $\Delta$ may be different from $\pi$, but $$2\pi \frac{OPL_{AC} - OPL_{BC}}{\lambda_0} + \Delta$$

may be approximately equal to $\pi$ to cause destructive interference between diffraction light 1232 and diffraction light 1242.

Figure 13A:
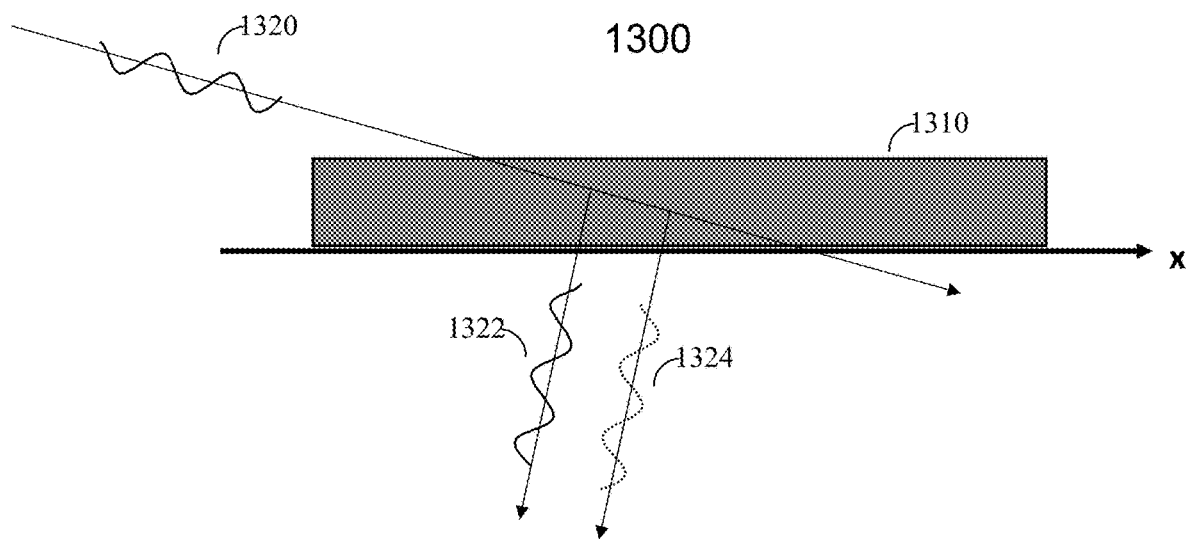
FIG. 13A illustrates light diffracted by a grating coupler in a waveguide display according to certain embodiments.

FIG. 13A illustrates light diffracted by a grating coupler 1310 in a waveguide display 1300 according to certain embodiments. Grating coupler 1310 may be similar to grating coupler 1220, and thus incident light 1320 (e.g., external light) may be diffracted by grating coupler 1310 into a first portion 1322 and a second portion 1324. As described above, by adjusting the height, period, and/or slant angle of grating coupler 1310, first portion 1322 and second portion 1324 may be out of phase by about 180° due to the relationship between the height, period, and slant angle of grating coupler 1310.

Figure 13B:
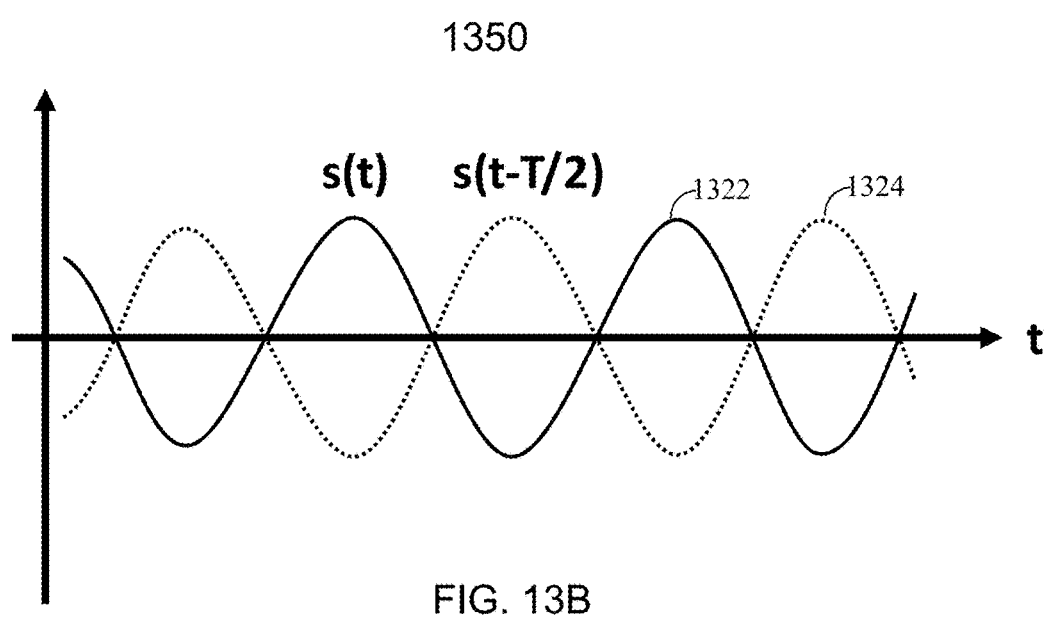
FIG. 13B is a waveform diagram illustrating the external light rainbow artifact reduction using a grating coupler according to certain embodiments.

FIG. 13B is a waveform diagram 1350 illustrating external light rainbow artifact reduction using grating coupler 1310 in waveguide display 1300 according to certain embodiments. The time domain waveforms of first portion 1322 and second portion 1324 may have the same frequency and amplitude, but may be time-shifted by a half time period (i.e., phase-shifted by 180°). Therefore, first portion 1322 and second portion 1324 may destructively interfere with each other, such that a sum (the overall electrical field) of first portion 1322 and second portion 1324 is about zero. In other words, the −1st order diffraction of external light by grating coupler 1310 may be significantly reduced or substantially eliminated.

Figure 14:
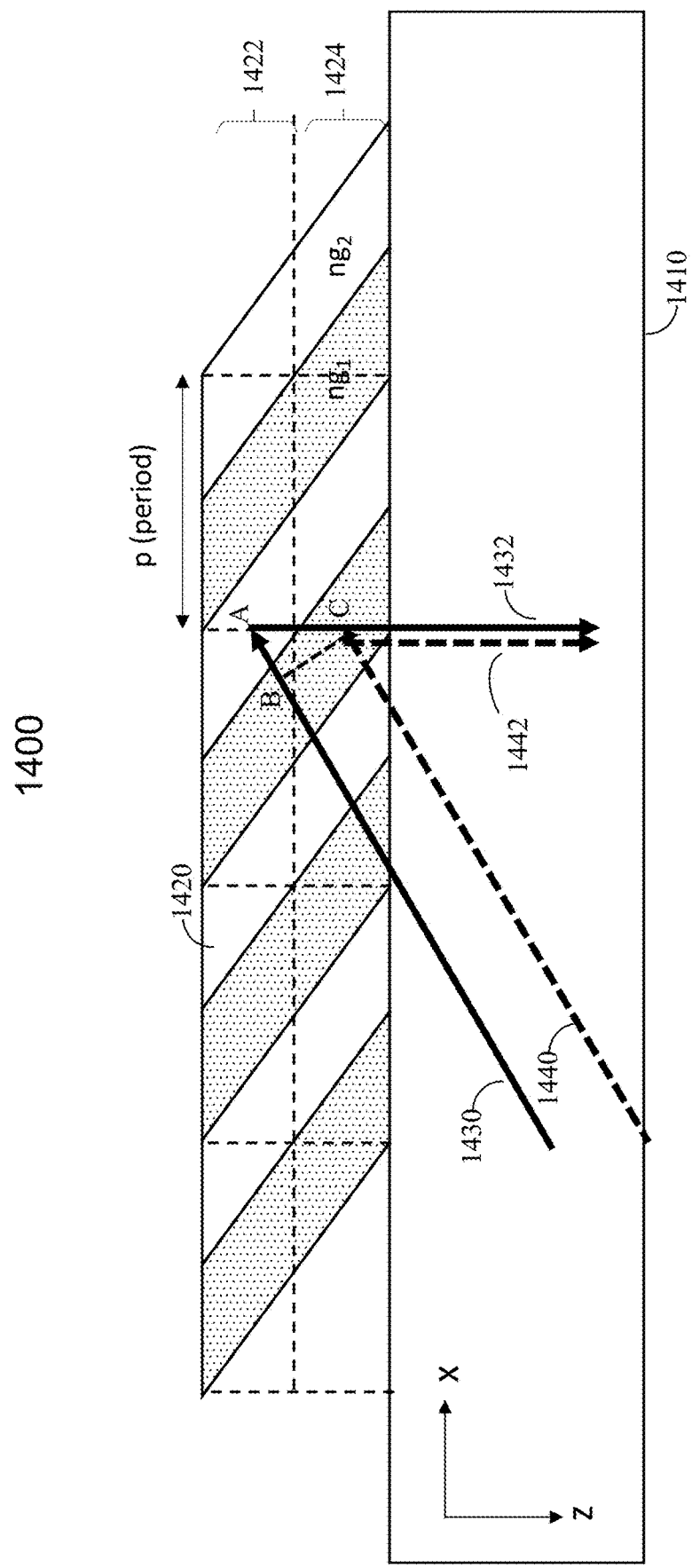
FIG. 14 is a simplified diagram illustrating the diffraction of display light by a grating coupler according to certain embodiments.

FIG. 14 is a simplified diagram illustrating display light diffraction (reflective diffraction) by a grating coupler 1420 in a waveguide display 1400 according to certain embodiments. As waveguide display 1200, waveguide display 1400 may include a waveguide 1410 and a grating coupler 1420 on one side of waveguide 1410. Grating coupler 1420 may include a first (top) slanted grating 1422 and a second (bottom) slanted grating 1424 each having a height of H/2, where H is the height of grating coupler 1420. First slanted grating 1422 and second slanted grating 1424 may be offset from each other in the x direction by about p/2, where p is the grating period of grating coupler 1420.

Display light coupled into waveguide 1410 may include a first portion (display light 1430) and a second portion (display light 1440). Display light 1430 may be diffracted by first slanted grating 1422 into a −1st order diffraction light 1432, and display light 1440 may be diffracted by second slanted grating 1424 into a −1st order diffraction light 1442. Because diffraction light 1432 may travel a longer distance than diffraction light 1442 due to the reflective diffraction, the phase difference between diffraction light 1432 and diffraction light 1442 may be less than 180°, and thus may not destructively interfere to cancel each other. For example, the phase difference between diffraction light 1432 and diffraction light 1442 may be approximated by:

$$2\pi \frac{OPL_{AC} - OPL_{AB}}{\lambda_0} + \Delta,$$

where $OPL_{AC}$ is the optical length between point A and point C, $OPL_{AB}$ is the optical length between point A and point B, $\lambda_0$ is the wavelength of the display light in free space, and $\Delta$ is the phase difference caused by the diffraction by first slanted grating 1422 and the diffraction by second slanted grating 1424. As described above, when the height of grating coupler 1420 is equal or close to (e.g., within about 5% or 10% of) an integer multiple of the grating period divided by the tangent of the slant angle of grating coupler 1420, $\Delta$ may be equal to about $\pi$, but $$2\pi \frac{OPL_{AC} - OPL_{AB}}{\lambda_0} + \Delta$$

may be significantly different from $\pi$. When the height, period, and/or slant angle of grating coupler 1420 are adjusted to cause destructive interference between the diffracted external light as described above with respect to FIG. 12, $$2\pi \frac{OPL_{AC} - OPL_{AB}}{\lambda_0} + \Delta$$

may also be significantly different from π. Thus, diffraction light 1432 and diffraction light 1442 may not destructively interfere to cancel each other. Thus, a relatively high diffraction efficiency, such as greater than 5%, 10%, 20%, 30%, 50%, or higher, may be achieved for the display light.

In this way, the grating coupler may diffract external light with a low diffraction efficiency to reduce artifacts, and may diffract display light with a much higher diffraction efficiency to couple the display light out of the waveguide.

It is noted that the grating couplers described above with respect to FIGS. 12 and 14 are just some example implementations of grating couplers for reducing the overall diffraction of external light within a certain field of view. In various embodiments, the relationship between the height, period, and/or slant angle may be adjusted differently for different fields of view to reduce the overall diffraction of external light by the grating coupler.

In some implementations, the slanted grating described above may include a slanted surface-relief grating with empty spaces between the relief material (i.e., the ridges). In some implementations, the space between the ridges may be coated or filled with other material that has a different refractive index than the relief material. In some implementations, the slant angle may be between about 30° and about 70°. In one implementation, the grating period p of the grating coupler may be about 350 nm, the slant angle of the granting coupler may be about 60°, the height of the granting coupler may be about 202 nm, and the diffraction efficiency of the −1st diffraction of the external light by the grating coupler may be less than <1%. Because first slanted grating 1422 and second slanted grating 1424 are always offset from each other by a half grating period regardless of the duty cycle of the slanted grating, the duty cycle of the slanted grating can be any appropriate value. In some implementations, the duty cycle may be selected, for example, for ease of fabrication (e.g., etching or molding) and better mechanical characteristics. For example, in some implementations, the duty cycle may be between about 30% to about 70%.

Figure 15A:
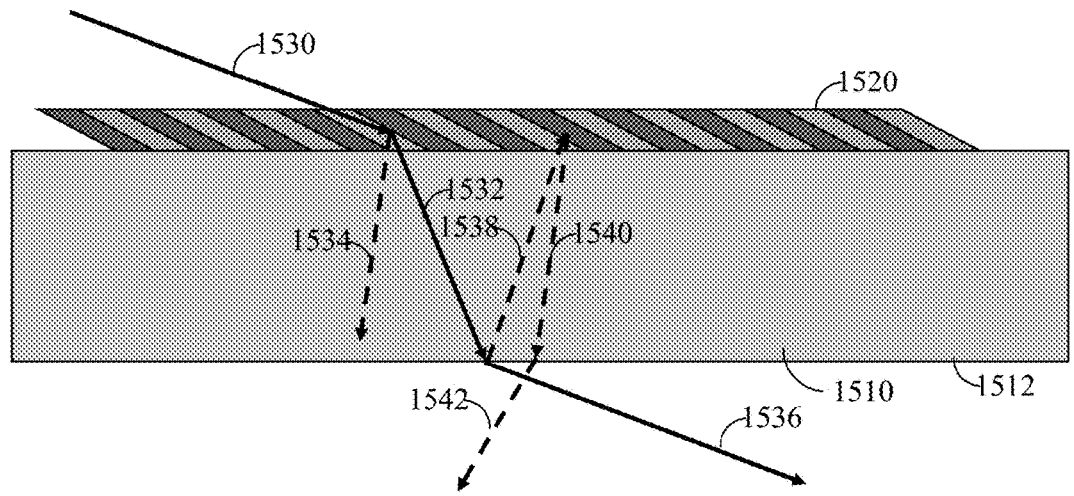
FIG. 15A illustrates rainbow artifacts caused by light reflection at a surface of a waveguide display according to certain embodiments.

FIG. 15A illustrates rainbow artifacts caused by light reflection at a surface of a waveguide display 1500 according to certain embodiments. Waveguide display 1500 may include a waveguide 1510 and a grating coupler 1520 at the top surface of waveguide 1510. Grating coupler 1520 may be similar to grating couplers 1120, 1220, 1310, and 1420 described above. External light incident on grating coupler 1520 may be diffracted by grating coupler 1520 into waveguide 1510. The diffracted light may include a $0^{th}$ order diffraction 1532 and a −1st order diffraction 1534. $0^{th}$ order diffraction 1532 may be refracted out of waveguide 1510 as light 1536. As described above, the height, period, and slant angle of grating coupler 1520 may be configured such that −1st order diffraction 1534 may be reduced or minimized.

However, $0^{th}$ order diffraction 1532 may be reflected at the bottom surface 1512 of waveguide 1510. Light 1538 reflected at bottom surface 1512 may reach grating coupler 1520 again, and may be reflectively diffracted by grating coupler 1520. As described above with respect to FIG. 14, the $-1^{st}$ order diffraction of the reflective diffraction by grating coupler 1520 may not be reduced or minimized even though grating coupler 1520 may be configured to reduce or minimize the $-1^{st}$ order diffraction of the transmissive diffraction. Thus, $-1^{st}$ order diffraction 1540 from reflected light 1538 may reach bottom surface 1512 and may be refracted out of waveguide 1510 as light 1542 that may appear as a rainbow ghost to the user's eye. Thus, waveguide display 1500 may still cause a relatively strong rainbow ghost image.

Figure 15B:
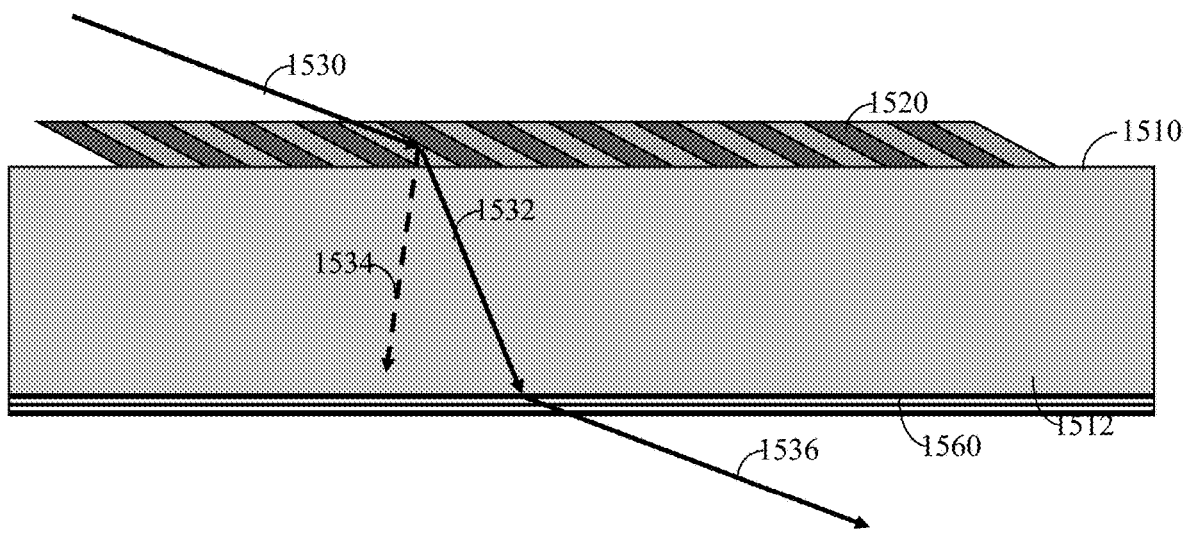
FIG. 15B illustrates an example waveguide display having an anti-reflective layer for reducing rainbow artifacts caused by light reflection at a surface of the waveguide display according to certain embodiments.

FIG. 15B illustrates an example waveguide display 1550 having an anti-reflective layer 1560 for reducing rainbow artifacts caused by light reflection at bottom surface 1512 of waveguide 1510 according to certain embodiments. Waveguide display 1550 may be similar to waveguide display 1500. Waveguide display 1550 may include an additional anti-reflective layer 1560 on bottom surface 1512 of waveguide 1510. Anti-reflection layer 1560 may include, for example, one or more dielectric thin film layers coated on bottom surface 1512, a nano-structured coating, or any other anti-reflection structures for reducing the reflection of visible light. Anti-reflection layer 1560 may be used to reduce the reflection of the diffracted external light at bottom surface 1512. Thus, little or no light may be reflected at bottom surface 1512 of waveguide 1510 back to grating coupler 1520, and therefore the rainbow ghost that might otherwise be formed due to the reflection of external light at bottom surface 1512 as described above with respect to FIG. 15A may be reduced or minimized.

Figure 16A:
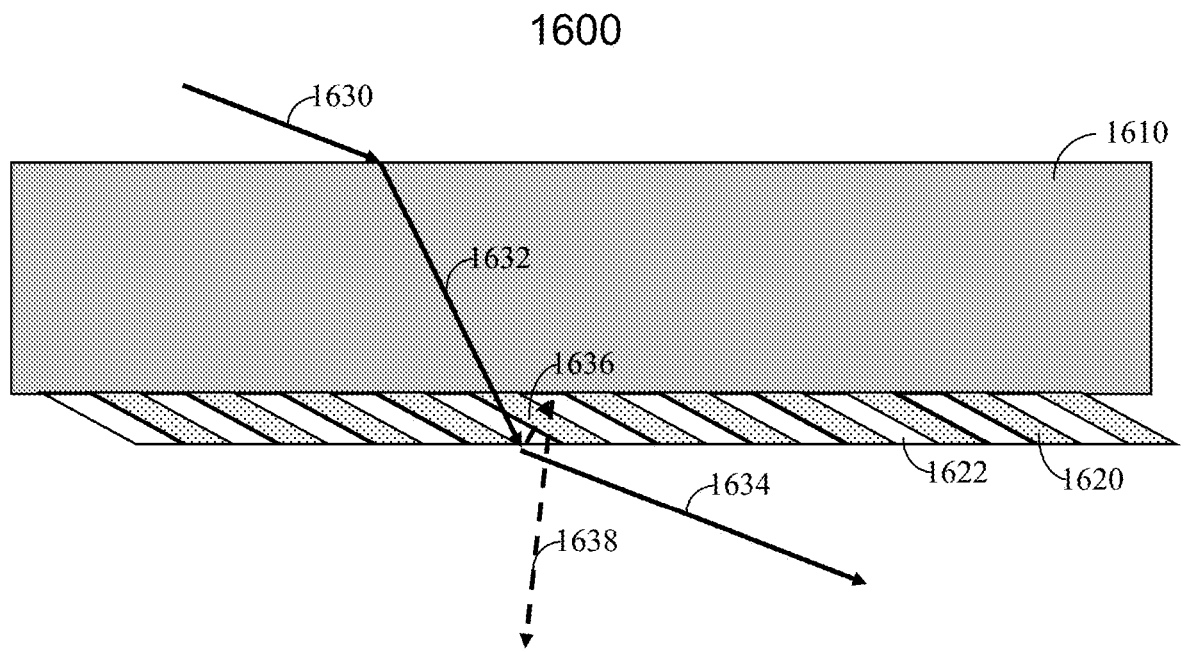
FIG. 16A illustrates rainbow artifacts caused by light reflection at a surface of a grating coupler of a waveguide display according to certain embodiments.

FIG. 16A illustrates rainbow artifacts caused by light reflection at a surface of a grating coupler 1620 of a waveguide display 1600 according to certain embodiments. Waveguide display 1600 may include a waveguide 1610 and a grating coupler 1620 at the bottom surface of waveguide 1610. Grating coupler 1620 may be similar to grating couplers 1120, 1220, 1310, 1420, and 1520 described above. External light incident on waveguide 1610 may be refracted into waveguide 1610 as external light 1632 and may then be diffracted by grating coupler 1620. The diffracted light may include a $0^{th}$ order diffraction 1634 and a −1st order diffraction (not shown). As described above, the height, period, and slant angle of grating coupler 1620 may be configured such that the −1st order diffraction may be reduced or minimized.

However, external light 1632 may be reflected at the bottom surface 1622 of grating coupler 1620. Light 1636 reflected at bottom surface 1622 of grating coupler 1620 may reach grating coupler 1620 again, and may be reflectively diffracted by grating coupler 1620. As described above with respect to FIG. 14, the $-1^{st}$ order diffraction of the reflective diffraction by grating coupler 1620 may not be reduced or minimized by a grating coupler that may be configured to reduce or minimize the $-1^{st}$ order diffraction of the transmissive diffraction. Thus, the $-1^{st}$ order diffraction 1638 from reflected light 1636 may reach the user's eye and thus may appear as a rainbow ghost to the user. Therefore, waveguide display 1600 may still cause a relatively strong rainbow ghost image.

Figure 16B:
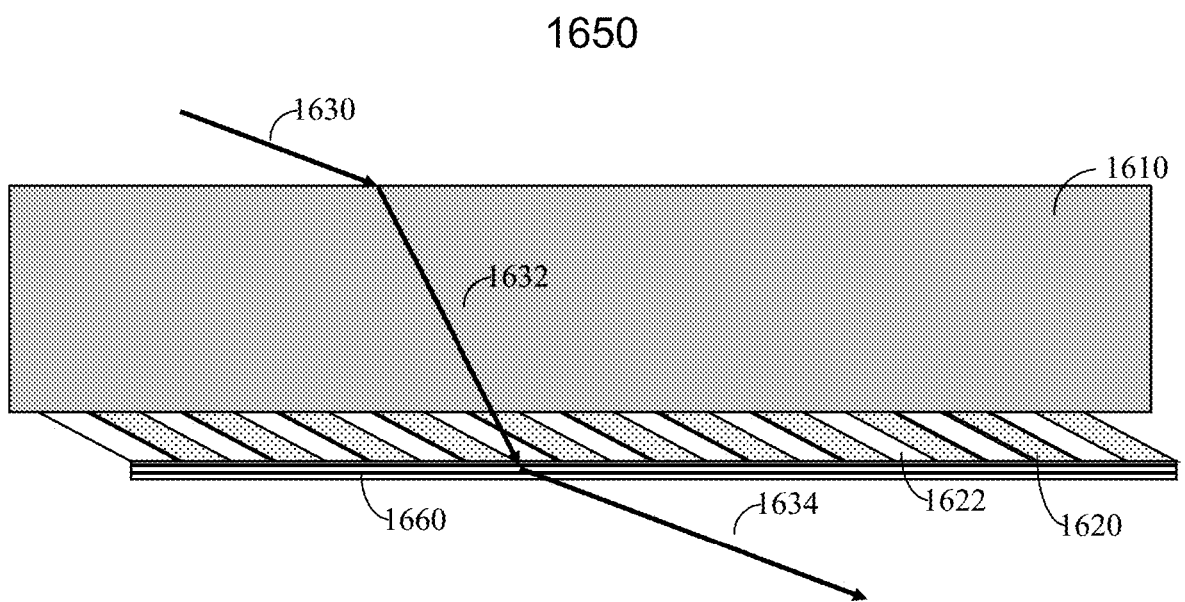
FIG. 16B illustrates an example waveguide display having an anti-reflective layer for reducing rainbow artifacts caused by light reflection at a surface of the grating coupler according to certain embodiments.

FIG. 16B illustrates an example waveguide display 1650 having an anti-reflective layer 1660 for reducing rainbow artifacts caused by light reflection at bottom surface 1622 of grating coupler 1620 of waveguide display 1650 according to certain embodiments. Waveguide display 1650 may be similar to waveguide display 1600, and may include an additional anti-reflective layer 1660 on bottom surface 1622 of grating coupler 1620. Anti-reflection layer 1660 may include one or more dielectric thin film layers coated on bottom surface 1622, and may be used to reduce the reflection of the external light at bottom surface 1622. Thus, little or no external light may be reflected at bottom surface 1622 of grating coupler 1620 back to grating coupler 1620, and therefore the rainbow ghost that might otherwise be formed due to the reflection of external light at bottom surface 1622 as described above with respect to FIG. 16A may be reduced or minimized. For display light propagating within waveguide 1610, at least a portion of the display light may be reflected at the interface between waveguide 1610 and grating coupler 1620 due to total internal reflection and/or reflective diffraction by grating coupler 1620, and thus may not reach anti-reflective layer 1660. Some portions of the display light may be diffracted by grating coupler 1620 and may be coupled out of waveguide 1610 towards user's eyes (e.g., due to $-1^{st}$ order diffraction). Anti-reflective layer 1660 may help to reduce the reflection of the portions of the display light that are coupled out of waveguide 1610 by grating coupler 1620.

The above described techniques may be used to reduce the artifacts (e.g., rainbow ghosts) caused by a one-dimensional grating coupler, and may also be used to reduce the artifacts caused by a multi-dimensional grating coupler, such as a two-dimensional grating coupler.

Figure 17A:
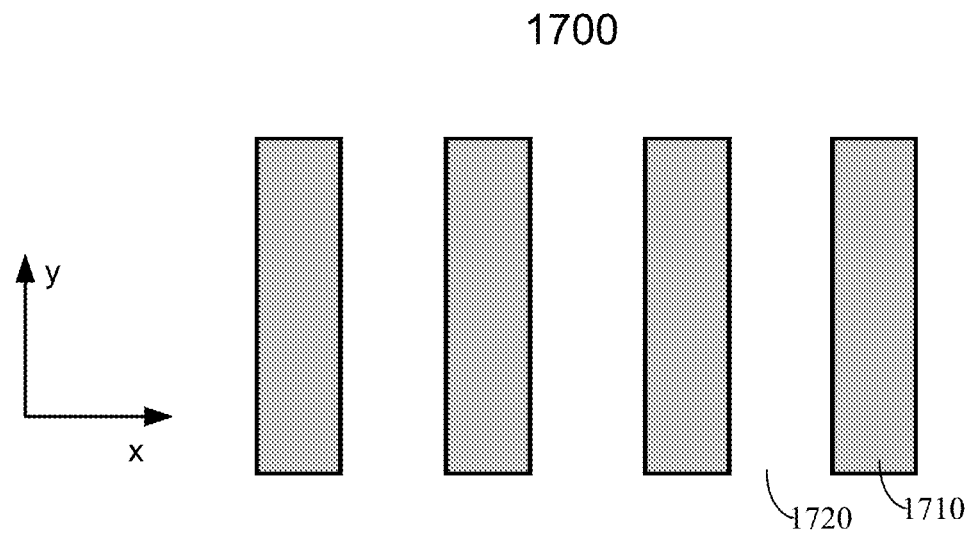
FIG. 17A is a top plan view of an example one-dimensional slanted surface-relief grating for rainbow artifact reduction according to certain embodiments.
Figure 17B:
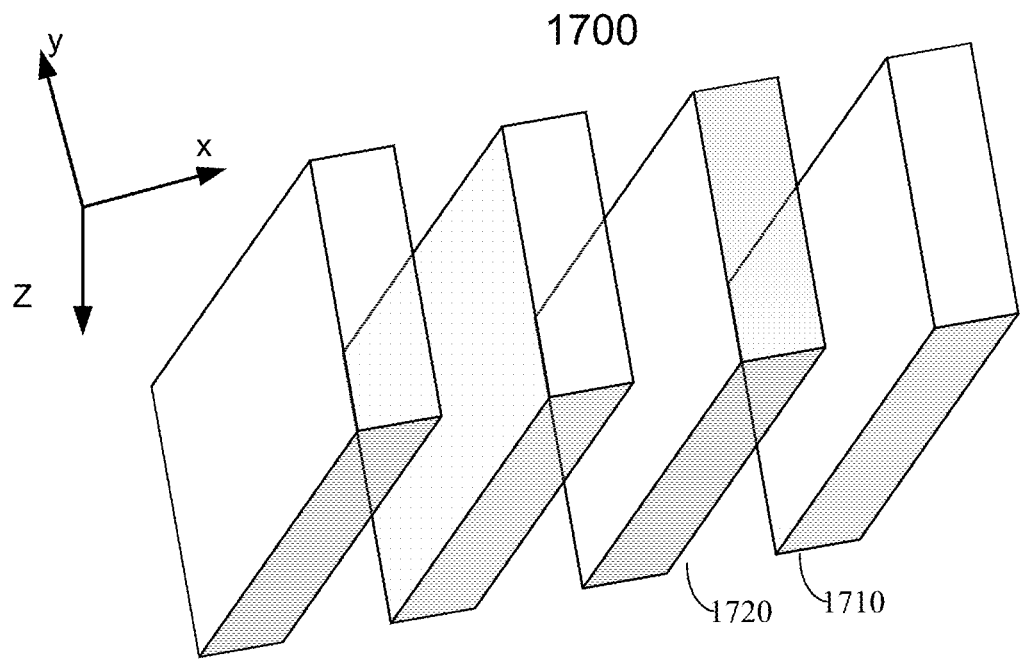
FIG. 17B is a perspective view of an example one-dimensional slanted surface-relief grating for rainbow artifact reduction according to certain embodiments.

FIG. 17A is a top plan view of an example one-dimensional slanted surface-relief grating 1700 for rainbow artifact reduction according to certain embodiments. FIG. 17B is a perspective view of the example one-dimensional slanted surface-relief grating 1700 for rainbow artifact reduction according to certain embodiments. One-dimensional slanted surface-relief grating 1700 may include a plurality of slanted ridges 1710 arranged in the x direction. Slanted ridges 1710 may include a material with a refractive index $n_1$. Slanted ridges 1710 may be tilted in the x direction at a certain slant angle with respect to the z direction. Gaps 1720 between slanted ridges 1710 may be open spaces or may be filled with a material with a refractive index $n_2$ different from $n_1$.

Figure 18A:
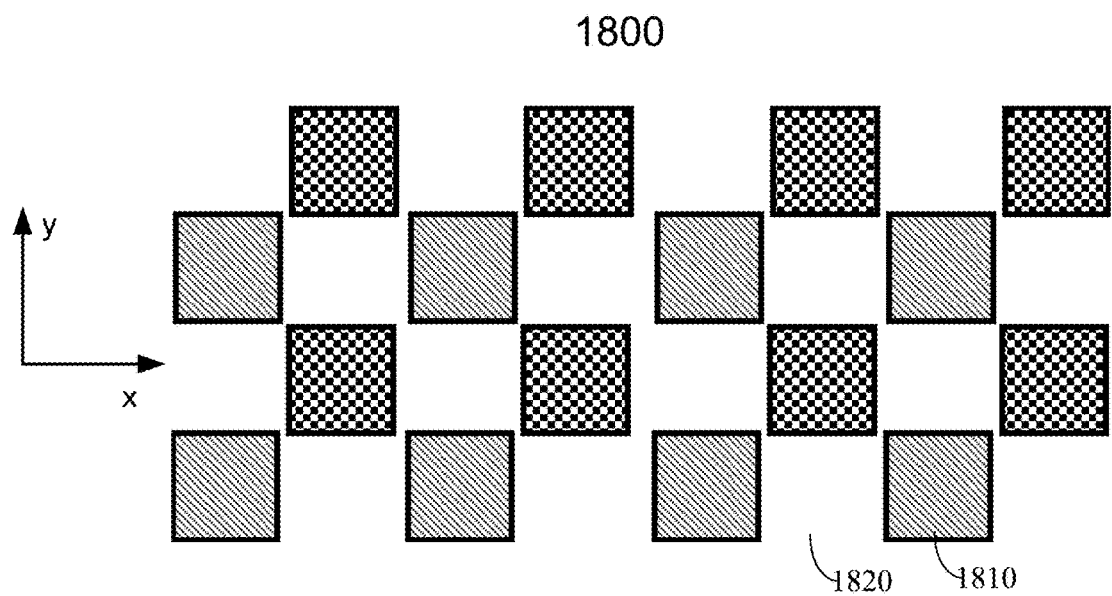
FIG. 18A is a top plan view of an example two-dimensional slanted surface-relief grating for rainbow artifact reduction according to certain embodiments.
Figure 18B:
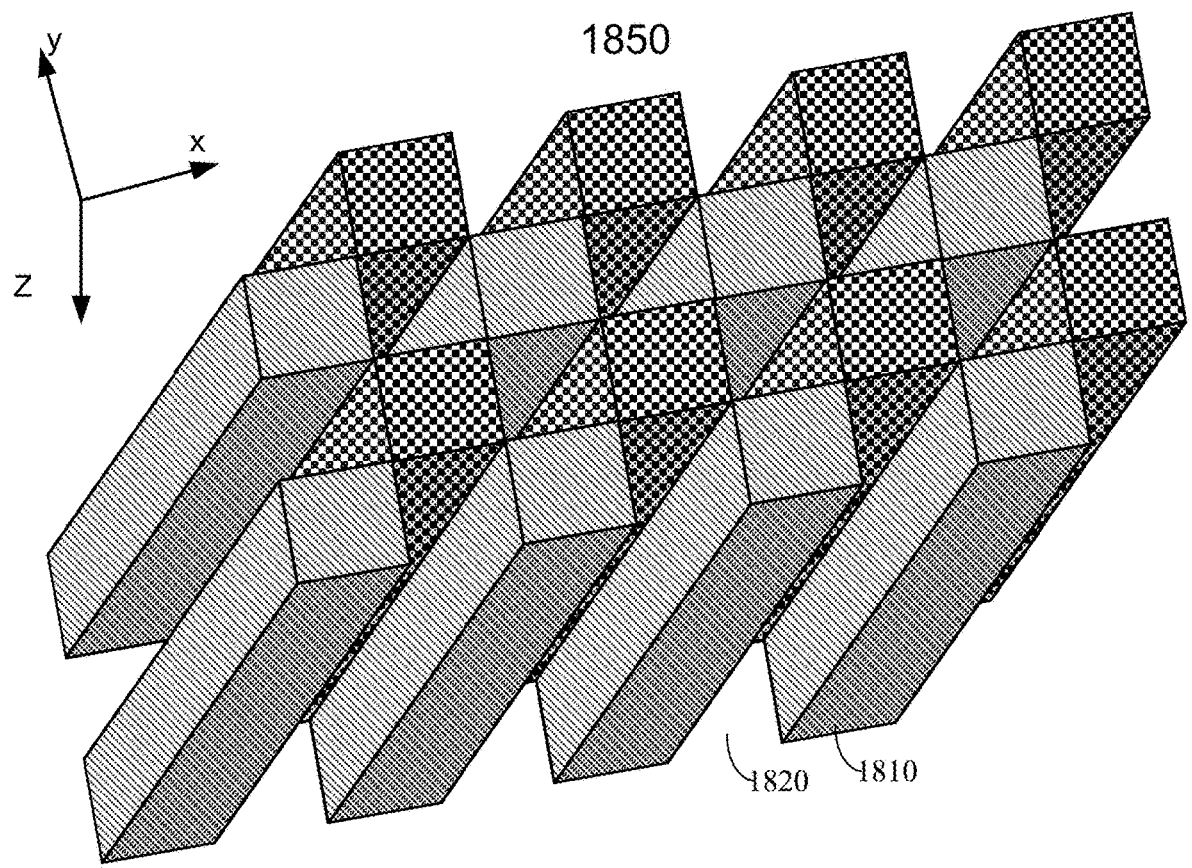
FIG. 18B is a perspective view of an example two-dimensional slanted surface-relief grating for rainbow artifact reduction according to certain embodiments.

FIG. 18A is a top plan view of an example two-dimensional slanted surface-relief grating 1800 for rainbow artifact reduction according to certain embodiments. FIG. 18B is a perspective view of the example two-dimensional slanted surface-relief grating 1800 for rainbow artifact reduction according to certain embodiments. Two-dimensional slanted surface-relief grating 1800 may include a plurality of slanted ridges 1810 arranged in the x and y directions. The grating periods and duty cycles of two-dimensional slanted surface-relief grating 1800 in the x and y directions may be the same or may be different. Slanted ridges 1810 may include a material with a refractive index of $n_1$. Slanted ridges 1810 may be tilted in the x-direction at a certain slant angle with respect to the z direction. In some embodiments, slanted ridges 1810 may also be tilted in the y-direction at a certain slant angle with respect to the z direction. Gaps 1820 between slanted ridges 1810 may be open spaces or may be filled with a material with a refractive index $n_2$ different from $n_1$.

The slanted grating of the grating coupler may be fabricated using many different nanofabrication techniques. The nanofabrication techniques generally include a patterning process and a post-patterning (e.g., over-coating) process. The patterning process may be used to from slanted ridges of the slanted grating. There may be many different nanofabrication techniques for forming the slanted ridges. For example, in some implementations, the slanted grating may be fabricated using lithography techniques. In some implementations, the slanted grating may be fabricated using nanoimprint lithography (NIL) molding techniques. The post-patterning process may be used to over-coat the slanted ridges and/or to fill the gaps between the slanted ridges with a material having a different refractive index than the slanted ridges. The post-patterning process may be independent from the patterning process. Thus, the same post-patterning process may be used on slanted gratings fabricated using any patterning techniques.

Techniques and processes for fabricating the slanted grating coupler described below are for illustration purposes only and are not intended to be limiting. A person skilled in the art would understand that various modifications may be made to the techniques described below. In some implementations, some operation described below may be omitted. In some implementations, additional operations may be performed to fabricate the grating coupler. For example, in some implementations, the surface of a mold or some other structures may be coated or plated prior to imprinting to reduce wearing of the mold, improve product quality, and reduce manufacturing cost. For example, in some implementations, an anti-sticking layer may be coated on the mold before the molding (or imprinting) process.

Figure 19A:
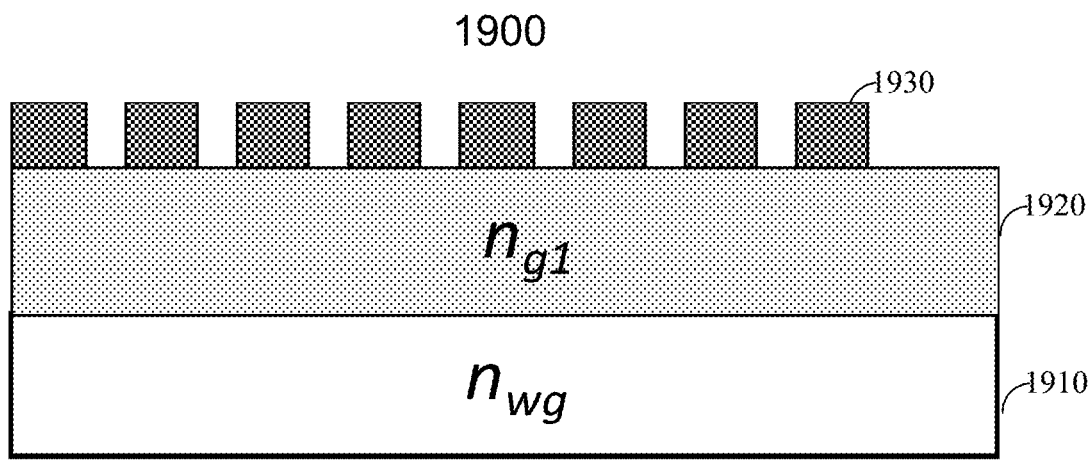
FIGS. 19A-19C illustrate an example process for fabricating a slanted surface-relief grating by slanted etching according to certain embodiments.
Figure 19B:
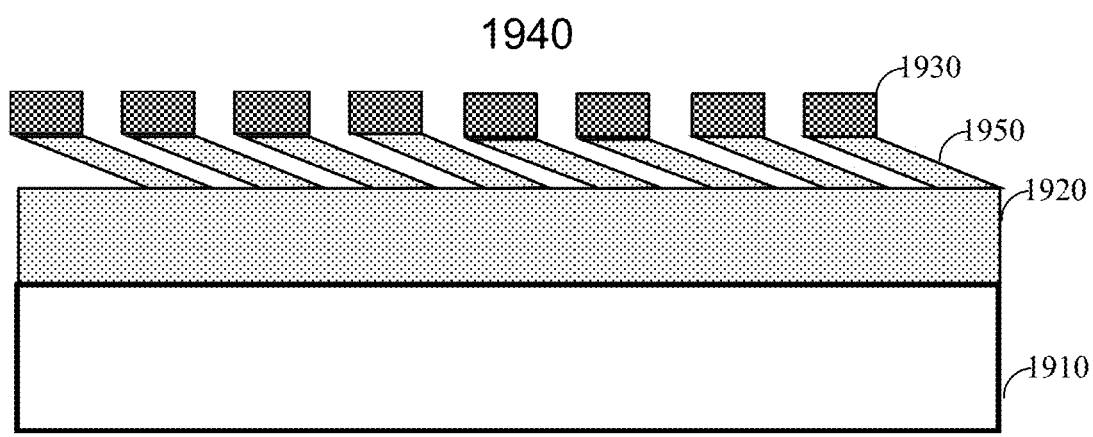
Figure 19C:
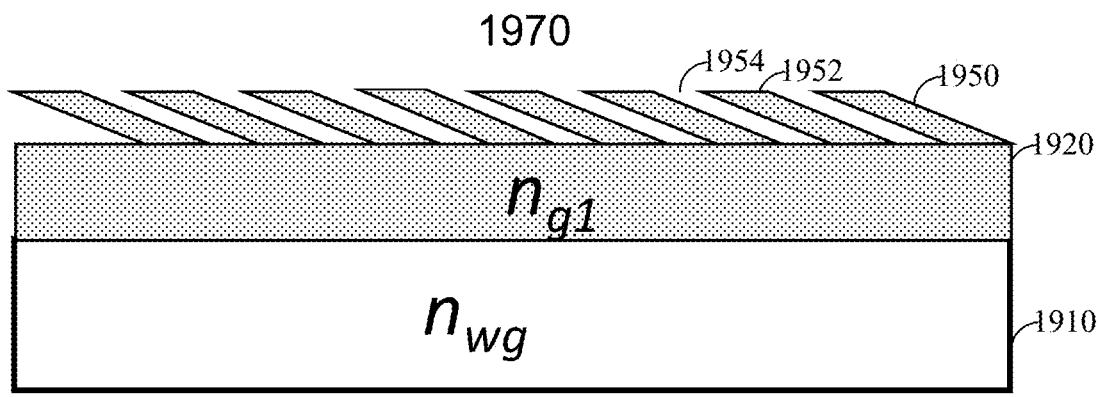

FIGS. 19A-19C illustrate an example simplified process for fabricating a slanted surface-relief grating by slanted etching according to certain embodiments. FIG. 19A shows a structure 1900 after a lithography process, such as a photolithography process. Structure 1900 may include a substrate 1910 that may be used as the waveguide of a waveguide display described above, such as a glass or quartz substrate. Structure 1900 may also include one or more layers of grating materials 1920, such as $Si_3N_4$ or $SiO_2$. Substrate 1910 may have a refractive index $n_{wg}$, and a layer of grating material 1920 may have a refractive index $n_{g1}$. A mask layer 1930 with a desired pattern may be formed on the layer(s) of grating material(s). Mask layer 1930 may include, for example, a photoresist material, a metal (e.g., copper, chrome, aluminum, or molybdenum), an intermetallic compound (e.g., $MoSi_2$), or a polymer. Mask layer 1930 may be formed by, for example, a lithography process described in detail below.

FIG. 19B shows a structure 1940 after a slanted etching process, such as a dry etching process (e.g., reactive ion etching (RIE), inductively coupled plasma (ICP), deep silicon etching (DSE), or ion beam etching (IBE)). The slanted etching process may include one or more sub-steps. The slanted etching may be performed, for example, by rotating structure 1900 based on the desired slant angle and etching layer(s) of grating material(s) 1920 vertically by the etching beam. After the etching, a slanted grating 1950 may be formed in layer(s) of grating material(s) 1920.

FIG. 19C shows a structure 1970 after mask layer 1930 is removed. Structure 1970 may include substrate 1910, one or more layers of grating materials 1920, and slanted grating 1950. Slanted grating 1950 may include a plurality of ridges 1952 and gaps 1954 between adjacent ridges 1952. Techniques such as plasma or wet etching may be used to strip the mask layer 1930 with appropriate chemistry. In some implementations, mask layer 1930 may not be removed and may be used as part of the slanted grating of the grating coupler.

Subsequently, in some implementations, the post-patterning (e.g., over-coating) process may be performed to over-coat slanted grating 1950 with a material having a refractive index higher or lower than the material of ridges 1952. For example, in some embodiments, a high refractive index material, such as Hafnia, Titania, Tungsten oxide, Zirconium oxide, Gallium sulfide, Gallium nitride, Gallium phosphide, silicon, and a high refractive index polymer, may be used for the over-coating. In some embodiments, a low refractive index material, such as silicon oxide, magnesium fluoride, porous silica, or fluorinated low index monomer (or polymer), etc., may be used for the over-coating. As a result, the difference between the refractive index of the ridges and the refractive index of the over-coat may be greater than 0.1, 0.2, 0.3, 0.5, 1.0, or higher.

FIGS. 20A-20E illustrate an example process for fabricating a slanted surface-relief grating by slanted etching according to certain embodiments. The example process shown by FIGS. 20A-20E may be a specific implementation of the example process shown by FIGS. 19A-19C.

FIG. 20A shows a structure 2000 after a waveguide 2010 is coated with one or more (e.g., between 1 and more than 100) layers 2020, including layer 1 (2020-1), layer 2 (2020-2), . . . , and layer n (2020-$n$). Waveguide 2010 may be a flat or curved substrate with a refractive index of $n_{wg}$, and the one or more layers 2020 may each have a same or different refractive index, such $n_{g1}$, $n_{g2}$, . . . , or $n_{gn}$. Layers 2020 may be selected for fabrication purposes, such as for coupling etching selectivity of adjacent layers to achieve a fast and highly selective slanted etch into the layer(s) that form the slanted grating (e.g., layer 1 (2020-1), such as a $Si_3N_4$ or $SiO_2$ layer). In some implementations, at least some of layers 2020 may form part of the slanted grating, and thus these layers may be additionally or alternatively selected based on the optical properties of the layers. A lithography layer 2030, such as a photoresist layer, may be formed on layer n (2020-$n$). In various implementations, layers 2020 and lithography layer 2030 may be formed on waveguide 2010 by deposition, such as plasma-enhanced chemical vapor deposition (PECVD), atomic layer deposition (ALD), sputtering, spin coating, or other techniques.

FIG. 20B shows a structure 2025 after a lithography process. The lithography process may be performed using, for example, an electron beam, focus ion beam, photolithography stepper, nano-imprint tool, etc. After the lithography process, lithography layer 2030 may include a desire pattern and may be used as a mask for the subsequent etching process.

FIG. 20C shows a structure 2040 after a certain number of etching sub-steps during the etching process. As described above, the etching process may be performed in a plasma chamber using, for example, an RIE, ICP, or IBE process. The etching process may include many sub-steps (e.g., as many sub-steps as the number of layers 2020 in the stack). The etching chemistry used for the etching may be different for etching different layers and/or may change while etching a same layer. Some or all sub-steps of the etching may be wet etching. In some implementations, all layers 2020 except layer 1 (2020-1) may be etched surface-normally as shown in FIG. 20C. In some embodiments, these layers may be etched at an angle that is equal or similar to the desired slant angle of the slanted grating. In some circumstances, depending on the etching selectivity of the different layers 2020, only layer 2 (2020-2) may still be there before layer 1 is etched because all others layers 2020 may have been removed during previous etching sub-steps. Generally, a thin resistant mask is desired for etching the final slant grating, while all other layers may be used to couple etching selectivity of adjacent layers to achieve a fast and highly selective slanted etch as described above. Thus, in some implementations, in the final etching sub-step (i.e., for etching layer 1), only layer 2 (2020-2) may be used as an etching mask to slant-etch layer 1 (2020-1). In cases where there is only one layer 2020 (i.e., only layer 1 (2020-1)) in the stack, only the lithography pattern may be present on top of layer 1 (2020-1), and thus the above sub-steps of the etching process may not need to be performed.

FIG. 20D shows a structure 2060 after the final etching sub-step is performed. The final etching sub-step may be a slant-etching process, during which waveguide 2010 may be rotated to a certain angle corresponding to the desired slant angle of the slanted grating. The final etching sub-step may be performed using, for example, an IBE tool with capabilities to rotate waveguide 2010 with respect to the direction of the ion beam. Layer 1 (2020-1) may be a high or low refractive index material. Depending on the material used for layer 1 (2020-1), the final etch mask (e.g., layer 2 (2020-2)) may be a metal mask (e.g., copper, chrome, aluminum, or molybdenum), an intermetallic compound (e.g., $MoSi_2$) mask, or a polymer-based mask. After the final etching sub-step, a slanted grating with slanted ridges may be formed within layer 1 (2020-1), and a portion of layer 2 (2020-2) may remain on the slanted grating.

FIG. 20E shows a structure 2080 after the final etch mask (e.g., layer 2 (2020-2)) is removed. As described above with respect to FIG. 19C, techniques such as plasma or wet etching may be used to remove the remaining mask material with appropriate chemistry. In some implementations, the final etch mask (i.e., layer 2 (2020-2)) may not be removed and may be used as part of the slanted grating. Subsequently, in some implementations, a post-patterning (e.g., over-coating) process may be performed to over-coat the slanted grating formed in layer 1 (2020-1) with a material having a refractive index higher or lower than the refractive index of the material of layer 1 (2020-1), as described above.

Figure 21:
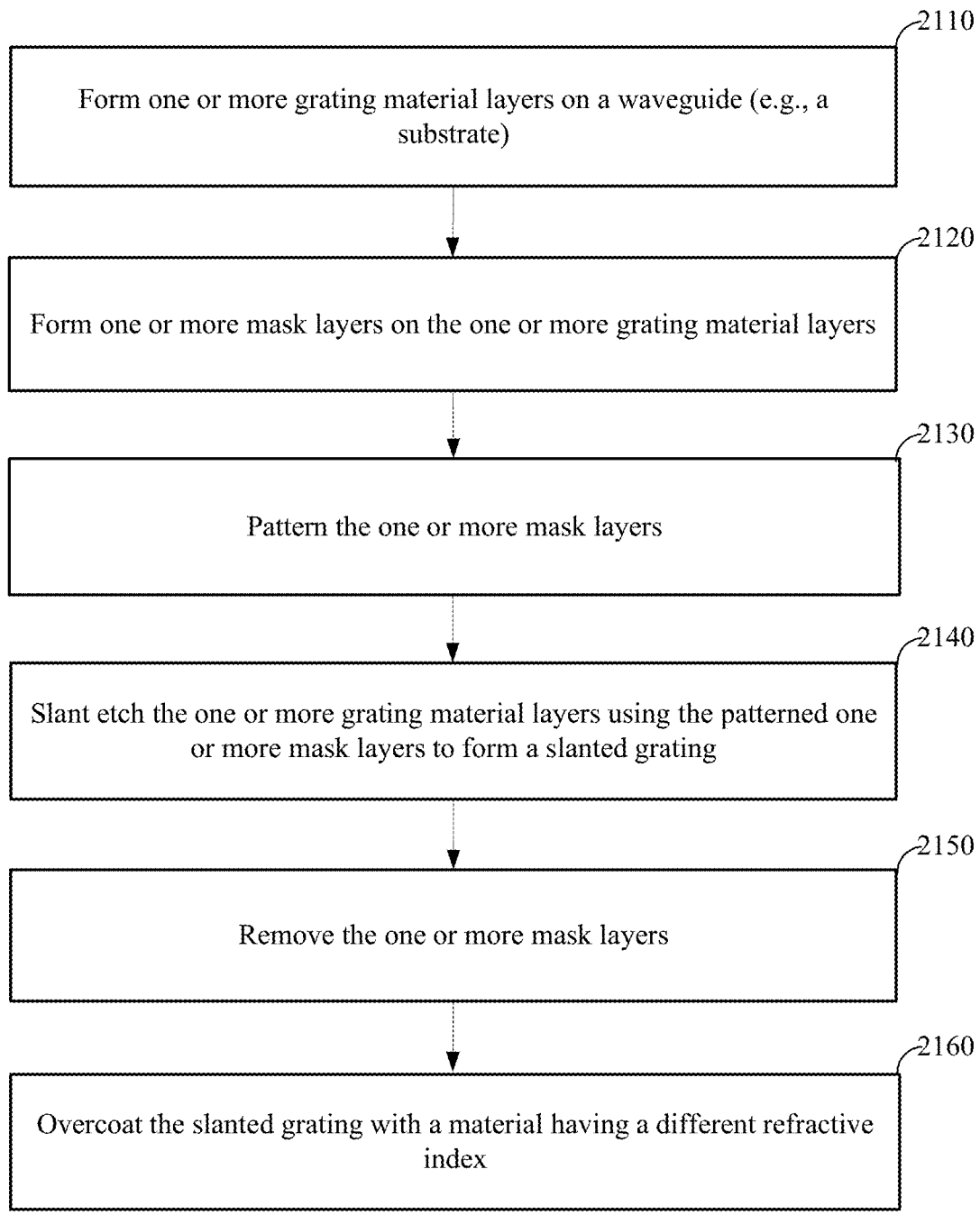
FIG. 21 is a simplified flow chart illustrating an example method of fabricating a slanted surface-relief grating according to certain embodiments.

FIG. 21 is a simplified flow chart 2100 illustrating an example method of fabricating a slanted surface-relief grating according to certain embodiments. The operations described in flow chart 2100 are for illustration purposes only and are not intended to be limiting. In various implementations, modifications may be made to flow chart 2100 to add additional operations or to omit some operations.

At block 2110, one or more grating material layers (e.g., layer 1 (2020-1)) may be formed on a waveguide (e.g., a substrate), as described above with respect to, for example, FIG. 20A. At block 2120, one or more mask layers (e.g., layer 2 (2020-2) to layer n (2020-$n$)) may be formed on the one or more grating material layers, as described above with respect to, for example, FIG. 20A. The one or more grating material layers and the one or more mask layers may be formed on the substrate using, for example, PECVD, ALD, sputtering, spin coating, or other techniques.

At block 2130, the one or more mask layers may be patterned based on the desired structure of the slanted grating, such as the period, duty cycle, cross-sectional dimensions of the desired slanted grating. The process for patterning the one or more mask layers may be similar to the techniques described above with respect to FIGS. 20B and 20C.

At block 2140, the one or more grating material layers may be slant-etched using the patterned one or more mask layers to form a slanted grating including a plurality of slanted grating ridges with gaps in between, as described above with respect to FIG. 20D. For example, the one or more grating material layers may be slant-etched using, for example, an IBE tool with capabilities to rotate the substrate with respect to the direction of the ion beam.

Optionally, at block 2150, any remaining layers of the one or more mask layers may be removed as described above with respect to FIG. 20E. As also described above, in some implementations, the operation in block 2150 may not be performed because, for example, the one or more mask layers may have already been etched away during the etching process, or the remaining mask layer(s) may form a part of the slanted grating.

Optionally, at block 2160, the slanted grating may be over-coated with a material having a refractive index different from the one or more grating material layers. For example, in some embodiments, a high refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and/or fill the gaps between the slanted grating ridges. In some embodiments, a low refractive index material, such as silicon oxide, magnesium fluoride, porous silica, or fluorinated low index monomer (or polymer), etc., may be used to over-coat the slanted grating and/or fill the gaps between the slanted grating ridges. As a result, the difference between the refractive index of the ridges and the refractive index of the over-coat may be greater than 0.1, 0.2, 0.3, 0.5, 1.0, or higher.

As described above, in some implementations, the slanted grating may also be fabricated using NIL molding techniques. For example, in some embodiments, an NIL mold may be fabricated, and the NIL mold may be used to mold the slanted grating directly, which may be referred to as hard stamp NIL or hard NIL. In some embodiments, an NIL mold may be fabricated first, a soft stamp may then be fabricated using the NIL mold, and the soft stamp may be used to fabricate the slanted grating, which may be referred to as soft stamp NIL or soft NIL.

FIGS. 22A-22H illustrate example processes for fabricating an NIL mold for use in molding slanted surface-relief gratings according to certain embodiments. The processes for fabricating the NIL mold may be similar to the process for fabricating the slanted surface-relief grating by slanted etching, as described above with respect to FIGS. 20A-20E and FIG. 21.

FIG. 22A shows a structure 2210 with a mold material layer 2202 and one or more mask layers (2204-1, 2204-2, ..., 2204-n, and 2206), where at least one mask layer may be a lithography layer 2206. Structure 2210 may be similar to structure 2000, where mold material layer 2202 (instead of layer 1 (2020-1) in FIG. 20A) may be used to form a grating structure. The mold material may include, for example, quartz, fused silica, silicon, other metal-oxides, or other plastic compounds. As described above with respect to FIG. 20A, mask layers 2204-1, 2204-2, ..., and 2204-n may be selected, for example, for coupling etching selectivity of adjacent mask layers to achieve a fast and highly selective slanted etch into mold material layer 2202.

FIG. 22B shows a structure 2220 after a lithography process. As described above with respect to FIG. 20B, the lithography process may be performed using, for example, an electron beam, focus ion beam, photolithography stepper, nano-imprint tool, etc. After the lithography process, lithography layer 2206 may include a desire pattern, and may be used as a mask for the subsequent etching process.

FIG. 22C shows a structure 2230 after a certain number of etching sub-steps during an etching process. As described above with respect to FIG. 20C, the etching process may be performed in a plasma chamber using, for example, an RIE, ICP, or IBE process. The etching process may include many sub-steps (e.g., as many sub-steps as the number of mask layers in the stack). The etching chemistry used for the etching may be different for etching different layers and/or may change while etching a same layer. Some or all sub-steps of the etching may be wet etching. In some implementations, the mask layers may be etched surface-normally as shown in FIG. 22C. In some circumstances, depending on the etching selectivity of the different mask layers, only one mask layer may remain before the mold material layer is etched, because all others mask layers may have been removed during previous etching sub-steps.

FIG. 22D shows a structure 2240 after the final etching sub-step is performed. The final etching sub-step may be a slant-etching process, during which mold material layer 2202 may be rotated to an angle corresponding to the desired slant angle of the slanted grating. The final etching sub-step may be performed using, for example, an IBE tool with capabilities to rotate the mold material layer with respect to the direction of the ion beam. The final mask layer (e.g., layer 1 (2204-1)) may be a metal mask (e.g., copper, chrome, aluminum, or molybdenum), an intermetallic compound (e.g., MoSi$_2$) mask, or a polymer-based mask. After the final etching sub-step, a slanted grating 2242 with slanted ridges may be formed within mold material layer 2202, and a portion of the final mask layer may remain on the slanted grating formed in the mold material layer.

FIG. 22E shows a structure 2250 after the final mask layer is removed. As described above, techniques such as plasma or wet etching may be used to remove the remaining mask material with appropriate chemistry. Structure 2250 may include slanted grating 2242 having a plurality of slanted ridges with gaps in between, and may be used as a master mold for making slanted gratings.

FIG. 22F shows a structure 2260 after a certain number of slanted etching sub-steps during an etching process. During these etching sub-steps, the mask layers may be etched at an angle that is equal or similar to the desired slant angle of the slanted grating, rather than being etched surface-normally as shown in FIG. 22C. In some implementations, only one mask layer may remain before the mold material layer is etched. In some implementations, more than one mask layer may remain before the mold material layer is etched. Thus, one or more mask layers (with slanted patterns 2262) may be used as the mask for etching the mold material layer.

FIG. 22G shows a structure 2270 after the final etching sub-step is performed. The final etching sub-step may also be a slant-etching process, during which the mold material layer may be rotated to an angle corresponding to the desired slant angle of the slanted grating, as described above with respect to FIG. 20D or 22D. The final etching sub-step may be performed using, for example, an IBE tool with capabilities to rotate the mold material layer with respect to the direction of the ion beam. After the final etching sub-step, a slanted grating with slanted ridges may be formed within the mold material layer, and a portion of the final mask layer may remain on the slanted grating formed in the mold material layer. The final mask layer may be removed to form the mold as shown in FIG. 22E.

In some embodiments, at least some of the mask layers may form part of the mold, and the mold material layer may not be etched or may only be partially etched. Thus, some mask layers in the stack may be removed selectively, while the remaining mask layers may be used as part of the mold. FIG. 22G shows an example mold structure 2280, where some of the mask layers form the slanted structure, while the mold material layer is not etched.

The fabricated mold may then be used to directly mold or imprint the slant grating (i.e., hard stamp NIL). In such case, the slanted structure on the mold may be complimentary to the desired slanted structure of the slanted grating used as the grating coupler on a waveguide display.

Figure 23A:
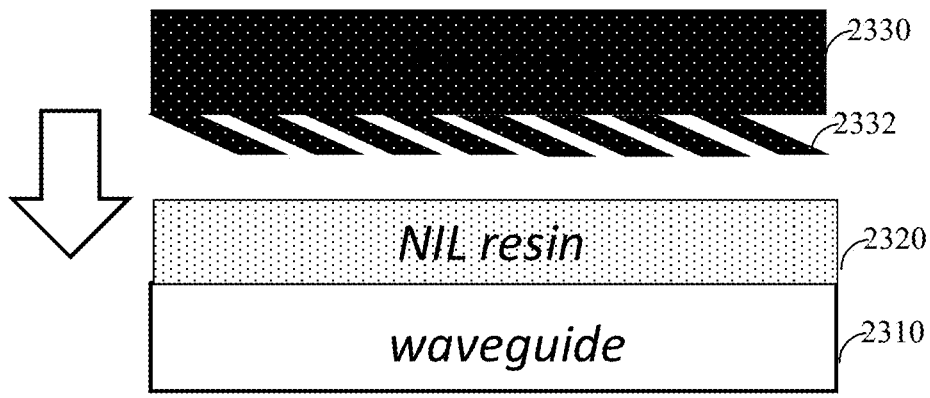
FIGS. 23A and 23B illustrate an example process for fabricating a slanted surface-relief grating by molding according to certain embodiments.
Figure 23B:
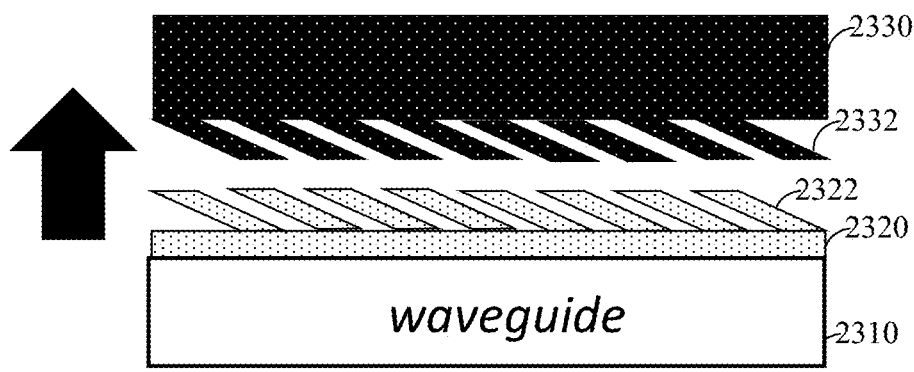

FIGS. 23A and 23B illustrate an example process for fabricating a slanted surface-relief grating by direct molding according to certain embodiments. In FIG. 23A, a waveguide 2310 may be coated with a NIL resin layer 2320. NIL resin layer 2320 may include, for example, a butyl-acrylate based resin doped with a resin comprising a sol-gel precursor, such as titanium butoxide, a monomer containing a reactive functional group for subsequent infusion processes (such as acrylic acid), and/or high refractive index nanoparticles (e.g., TiO$_2$, GaP, HfO$_2$, GaAs, etc.). NIL resin layer 2320 may be deposited on waveguide 2310 by, for example, spin-coating, lamination, or ink injection. A NIL mold 2330 with slanted ridges 2332 may be pressed against NIL resin layer 2320 and waveguide 2310 for molding a slanted grating in NIL resin layer 2320. NIL resin layer 2320 may be cured subsequently by, for example, cross-linked using heat and/or ultraviolet (UV) light.

FIG. 23B shows the demolding process, during which NIL mold 2330 is detached from NIL resin layer 2320 and waveguide 2310. As shown in FIG. 23B, after NIL mold 2330 is detached from NIL resin layer 2320 and waveguide 2310, a slanted grating 2322 that is complementary to the slanted ridges 2332 on NIL mold 2330 may be formed in NIL resin layer 2320 on waveguide 2310.

In soft stamp NIL, an NIL mold may be fabricated first as described above with respect to FIGS. 22A-22H. A soft stamp may be fabricated using the NIL mold, and the soft stamp may then be used to fabricate the slanted grating. In such a process, the slanted grating structure on the NIL mold may be similar to the slanted grating of the grating coupler for the waveguide display, and the slanted grating structure on the soft stamp may be complementary to the slanted grating structure on the NIL mold and the slanted grating of the grating coupler for the waveguide display. Compared with a hard stamp or hard mold, a soft stamp may offer more flexibility during the molding and demolding processes.

FIGS. 24A-24D illustrate an example process for fabricating a soft stamp used for making a slanted surface-relief grating according to certain embodiments. FIG. 24A shows a master mold 2410 (e.g., a hard mold or hard stamp). Master mold 2410 may be fabricated using the process described above with respect to FIGS. 22A-22H. As shown in FIG. 24A, master mold 2410 may include a slanted grating 2420 that may in turn include a plurality of slanted ridges 2422 with gaps 2424 between slanted ridges 2422.

FIG. 24B illustrates master mold 2410 coated with a soft stamp material layer 2430. Soft stamp material layer 2430 may include, for example, a resin material or a curable polymer material, and may be coated on master mold 2410 by, for example, spin-coating or ink injection.

FIG. 24C illustrates a lamination process for laminating soft stamp material layer 2430 on a soft stamp foil 2440. A roller 2450 may be used to press soft stamp foil 2440 against soft stamp material layer 2430. The lamination process may also be a planarization process to make the thickness of soft stamp material layer 2430 substantially uniform. After the lamination process, soft stamp foil 2440 may be tightly or securely attached to soft stamp material layer 2430.

FIG. 24D illustrates a delamination process, where a soft stamp including soft stamp foil 2440 and attached soft stamp material layer 2430 is detached from master mold 2410. Soft stamp material layer 2430 may include a slanted grating structure that is complementary to the slanted grating structure on master mold 2410. Because the flexibility of soft stamp foil 2440 and attached soft stamp material layer 2430, the delamination process may be relatively easy compared with a demolding process using a hard stamp or mold. In some implementations, an anti-sticking layer may be formed on master mold 2410 before soft stamp material layer 2430 is formed on master mold 2410, which may also facilitate the delamination process. After the delamination of the soft stamp from master mold 2410, the soft stamp may be used to mold the slanted grating on a waveguide of a waveguide display.

FIGS. 25A-25D illustrate an example process for fabricating a slanted surface-relief grating using a soft stamp according to certain embodiments. FIG. 25A shows a waveguide 2510 coated with an imprint resin layer 2520. Imprint resin layer 2520 may include, for example, a butyl-acrylate based resin doped with a resin comprising a sol-gel precursor, such as titanium butoxide, a monomer containing a reactive functional group for subsequent infusion processes (such as acrylic acid), and/or high refractive index nanoparticles (e.g., $TiO_2$, GaP, $HfO_2$, GaAs, etc.). Imprint resin layer 2520 may be deposited on waveguide 2510 by, for example, spin-coating, lamination, or ink injection. A soft stamp 2530 including slanted ridges 2532 attached to a soft stamp foil 2540 may be used for the imprint.

FIG. 25B shows the lamination of soft stamp 2530 onto imprint resin layer 2520. Soft stamp 2530 may be pressed against imprint resin layer 2520 and waveguide 2510 using a roller 2550, such that slanted ridges 2532 may be pressed into imprint resin layer 2520. Imprint resin layer 2520 may be cured subsequently by, for example, cross-linked using heat and/or ultraviolet (UV) light.

FIG. 25C shows the delamination of soft stamp 2530 from imprint resin layer 2520. The delamination may be performed by lifting soft stamp foil 2540 to detach slanted ridges 2532 of soft stamp 2530 from imprint resin layer 2520. Imprint resin layer 2520 may now include a slanted grating 2522, which may be used as the grating coupler or may be over-coated to form the grating coupler for the waveguide display. As described above, because of the flexibility of soft stamp 2530, the delamination process may be relatively easy compared with a demolding process using a hard stamp or mold.

FIG. 25D shows an example imprinted slanted grating 2522 formed on waveguide 2510 using soft stamp 2530. As described above, imprint slanted grating 2522 may include ridges and gaps between the ridges and thus may be over-coated with a material having a refractive index different from imprint resin layer 2520 to fill the gaps and form the grating coupler for the waveguide display.

Figure 26:
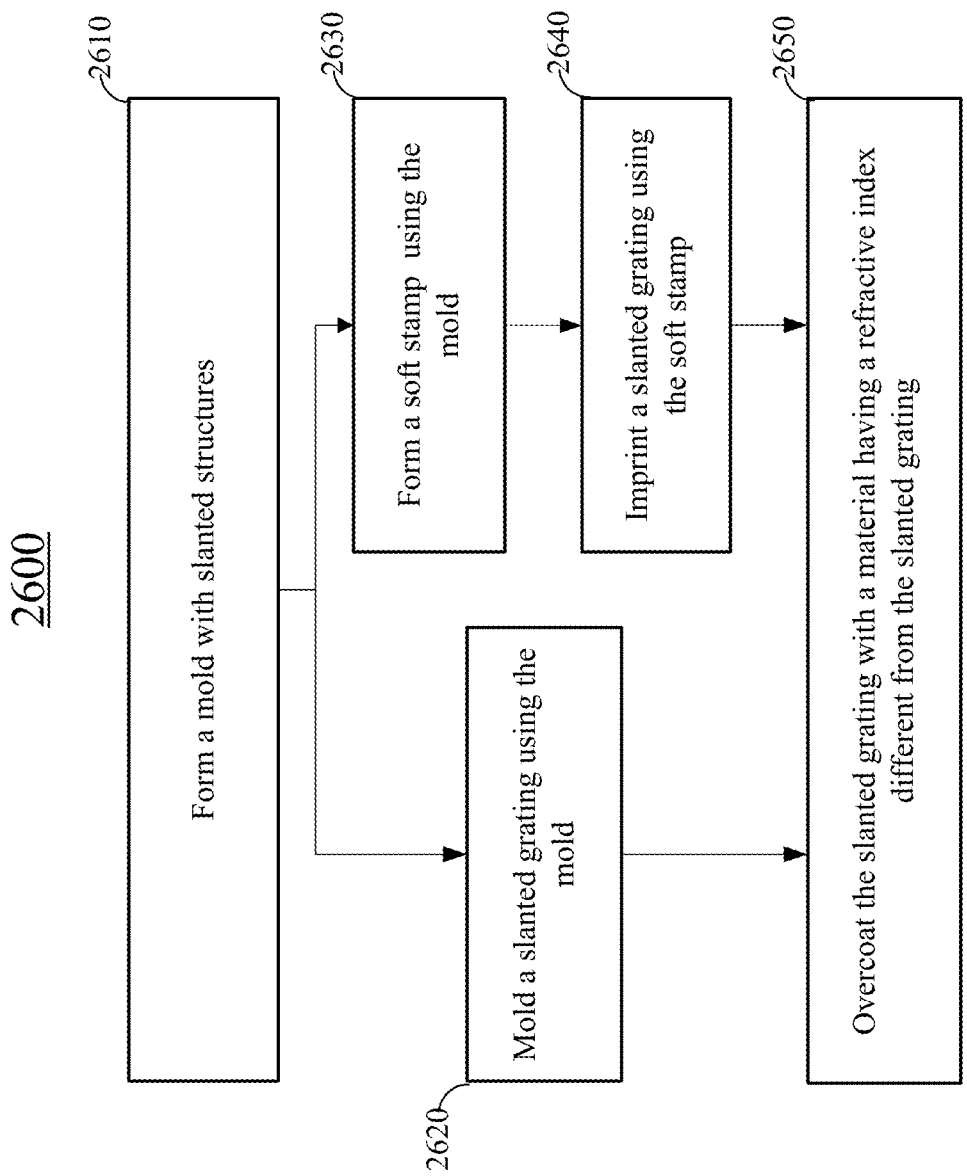
FIG. 26 is a simplified flow chart illustrating an example method of fabricating a slanted surface-relief grating according to certain embodiments.

FIG. 26 is a simplified flow chart 2600 illustrating example methods of fabricating a slanted surface-relief grating according to certain embodiments. Even though FIG. 26 describes the operations as a sequential process, some of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block.

At block 2610, a mold with a slanted structure may be fabricated as described above with respect to FIGS. 22A-22H. The mold may include quartz, fused silica, silicon, other metal-oxides, or other plastic compounds. The mold may be used as a master mold for molding the slanted grating directly (i.e., hard NIL) at block 2620. Alternatively, the mold may be used as master mold for making a soft stamp for soft stamp NIL at block 2630 and block 2640. As described above, the slanted structure of the mold for hard NIL may be complementary to the desired slanted grating, while the slanted structure of the mold used to make the soft stamp for soft NIL may be similar to the desired slanted grating.

At block 2620, a slanted grating may be molded in, for example, a resin layer using the mold as described above with respect to FIGS. 23A and 23B. The resin layer may be coated on a waveguide substrate, and may include, for example, a butyl-acrylate based resin doped with a resin comprising a sol-gel precursor, such as titanium butoxide, a monomer containing a reactive functional group for subsequent infusion processes (such as acrylic acid), and/or high refractive index nanoparticles (e.g., $TiO_2$, GaP, $HfO_2$, GaAs, etc.). The mold may be pressed against the resin layer. The resin layer may then be cured to fix the structure formed within the resin layer by the mold. The mold may be detached from the resin layer to form a slanted grating within the resin layer.

Alternatively, at block 2630, a soft stamp with a slanted structure may be fabricated using the mold as described above with respect to FIGS. 24A-24D. The process of fabricating the soft stamp may include coating the mold with a soft stamp material, such as a resin material. A soft stamp foil may then be laminated on the soft stamp material, for example, using a roller. The soft stamp foil and the attached soft stamp material may be securely attached to each other and may be detached from the mold to form the soft stamp.

At block 2640, a slanted surface-relief grating may be imprinted using the soft stamp as described above with respect to FIGS. 25A-25D. For example, a waveguide substrate may be coated with an imprint resin layer. The soft stamp may be laminated on the imprint resin layer using, for example, a roller. After the imprint resin layer is cured, the soft stamp may be delaminated from the imprint resin layer to form a slanted grating within the imprint resin layer.

Optionally, at block 2650, the slanted grating may be over-coated with a material having a refractive index different from the slanted grating (e.g., the imprint resin layer). For example, in some embodiments, a high refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and fill the gaps between the slanted grating ridges. In some embodiments, a low refractive index material, such as silicon oxide, magnesium fluoride, porous silica, or fluorinated low index monomer (or polymer), etc., may be used to over-coat the slanted grating and fill the gaps between the slanted grating ridges.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 27:
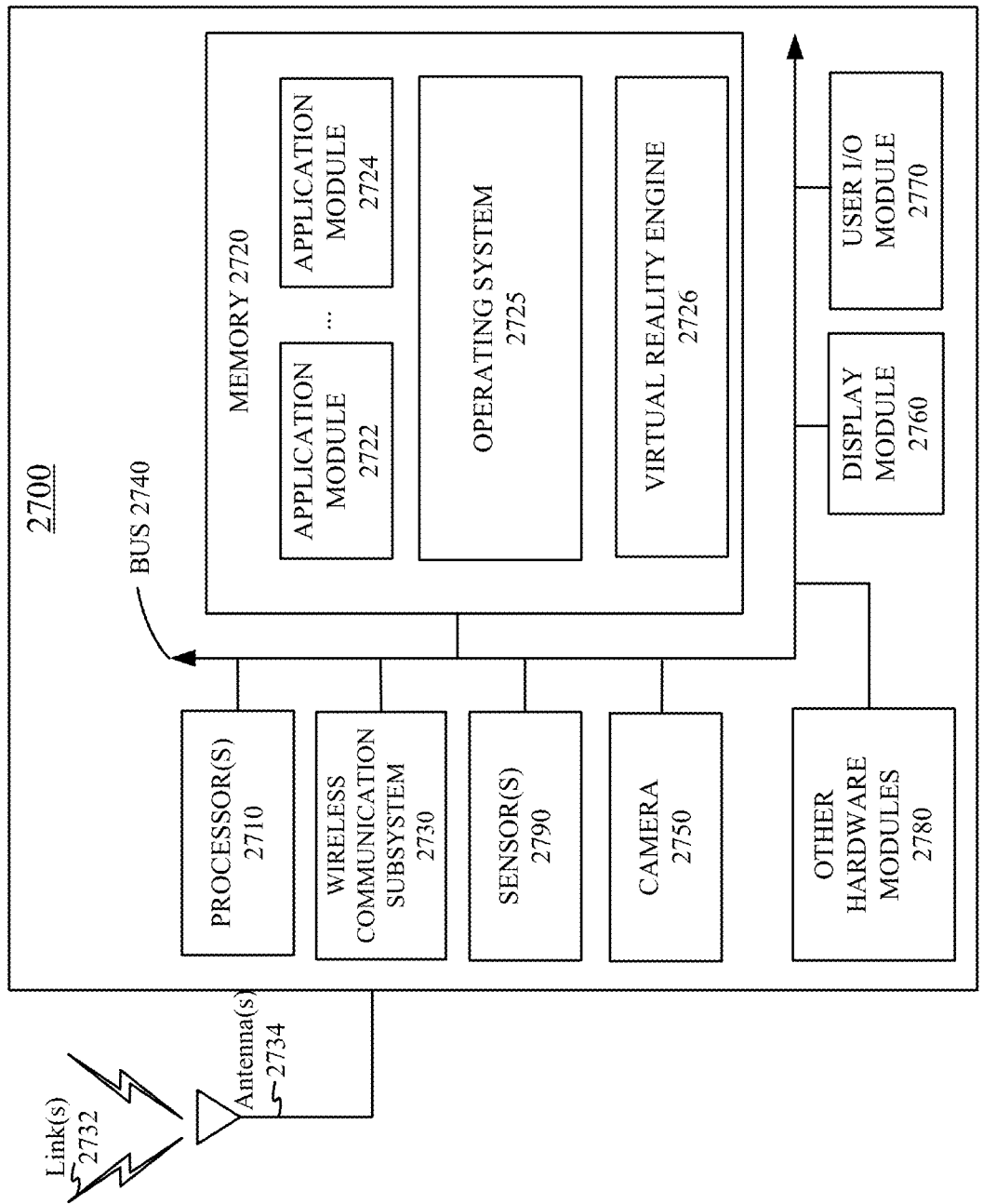
FIG. 27 is a simplified block diagram of an example electronic system of an example near-eye display for implementing some of the examples disclosed herein.

FIG. 27 is a simplified block diagram of an example electronic system 2700 of an example near-eye display (e.g., HMD device) for implementing some of the examples disclosed herein. Electronic system 2700 may be used as the electronic system of an HMD device or other near-eye displays described above. In this example, electronic system 2700 may include one or more processor(s) 2710 and a memory 2720. Processor(s) 2710 may be configured to execute instructions for performing operations at a number of components, and can be, for example, a general-purpose processor or microprocessor suitable for implementation within a portable electronic device. Processor(s) 2710 may be communicatively coupled with a plurality of components within electronic system 2700. To realize this communicative coupling, processor(s) 2710 may communicate with the other illustrated components across a bus 2740. Bus 2740 may be any subsystem adapted to transfer data within electronic system 2700. Bus 2740 may include a plurality of computer buses and additional circuitry to transfer data.

Memory 2720 may be coupled to processor(s) 2710. In some embodiments, memory 2720 may offer both short-term and long-term storage and may be divided into several units. Memory 2720 may be volatile, such as static random access memory (SRAM) and/or dynamic random access memory (DRAM) and/or non-volatile, such as read-only memory (ROM), flash memory, and the like. Furthermore, memory 2720 may include removable storage devices, such as secure digital (SD) cards. Memory 2720 may provide storage of computer-readable instructions, data structures, program modules, and other data for electronic system 2700. In some embodiments, memory 2720 may be distributed into different hardware modules. A set of instructions and/or code might be stored on memory 2720. The instructions might take the form of executable code that may be executable by electronic system 2700, and/or might take the form of source and/or installable code, which, upon compilation and/or installation on electronic system 2700 (e.g., using any of a variety of generally available compilers, installation programs, compression/decompression utilities, etc.), may take the form of executable code.

In some embodiments, memory 2720 may store a plurality of application modules 2722 through 2724, which may include any number of applications. Examples of applications may include gaming applications, conferencing applications, video playback applications, or other suitable applications. The applications may include a depth sensing function or eye tracking function. Application modules 2722-2724 may include particular instructions to be executed by processor(s) 2710. In some embodiments, certain applications or parts of application modules 2722-2724 may be executable by other hardware modules 2780. In certain embodiments, memory 2720 may additionally include secure memory, which may include additional security controls to prevent copying or other unauthorized access to secure information.

In some embodiments, memory 2720 may include an operating system 2725 loaded therein. Operating system 2725 may be operable to initiate the execution of the instructions provided by application modules 2722-2724 and/or manage other hardware modules 2780 as well as interfaces with a wireless communication subsystem 2730 which may include one or more wireless transceivers. Operating system 2725 may be adapted to perform other operations across the components of electronic system 2700 including threading, resource management, data storage control and other similar functionality.

Wireless communication subsystem 2730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2700 may include one or more antennas 2734 for wireless communication as part of wireless communication subsystem 2730 or as a separate component coupled to any portion of the system. Depending on desired functionality, wireless communication subsystem 2730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2730 may permit data to be exchanged with a network, other computer systems, and/or any other devices described herein. Wireless communication subsystem 2730 may include a means for transmitting or receiving data, such as identifiers of HMD devices, position data, a geographic map, a heat map, photos, or videos, using antenna(s) 2734 and wireless link(s) 2732. Wireless communication subsystem 2730, processor(s) 2710, and memory 2720 may together comprise at least a part of one or more of a means for performing some functions disclosed herein.

Embodiments of electronic system 2700 may also include one or more sensors 2790. Sensor(s) 2790 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2790 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2700 may include a display module 2760. Display module 2760 may be a near-eye display, and may graphically present information, such as images, videos, and various instructions, from electronic system 2700 to a user. Such information may be derived from one or more application modules 2722-2724, virtual reality engine 2726, one or more other hardware modules 2780, a combination thereof, or any other suitable means for resolving graphical content for the user (e.g., by operating system 2725). Display module 2760 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2700 may include a user input/output module 2770. User input/output module 2770 may allow a user to send action requests to electronic system 2700. An action request may be a request to perform a particular action. For example, an action request may be to start or end an application or to perform a particular action within the application. User input/output module 2770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2700. In some embodiments, user input/output module 2770 may provide haptic feedback to the user in accordance with instructions received from electronic system 2700. For example, the haptic feedback may be provided when an action request is received or has been performed.

Electronic system 2700 may include a camera 2750 that may be used to take photos or videos of a user, for example, for tracking the user's eye position. Camera 2750 may also be used to take photos or videos of the environment, for example, for VR, AR, or MR applications. Camera 2750 may include, for example, a complementary metal-oxide-semiconductor (CMOS) image sensor with a few millions or tens of millions of pixels. In some implementations, camera 2750 may include two or more cameras that may be used to capture 3-D images.

In some embodiments, electronic system 2700 may include a plurality of other hardware modules 2780. Each of other hardware modules 2780 may be a physical module within electronic system 2700. While each of other hardware modules 2780 may be permanently configured as a structure, some of other hardware modules 2780 may be temporarily configured to perform specific functions or temporarily activated. Examples of other hardware modules 2780 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2780 may be implemented in software.

In some embodiments, memory 2720 of electronic system 2700 may also store a virtual reality engine 2726. Virtual reality engine 2726 may execute applications within electronic system 2700 and receive position information, acceleration information, velocity information, predicted future positions, or some combination thereof of the HMD device from the various sensors. In some embodiments, the information received by virtual reality engine 2726 may be used for producing a signal (e.g., display instructions) to display module 2760. For example, if the received information indicates that the user has looked to the left, virtual reality engine 2726 may generate content for the HMD device that mirrors the user's movement in a virtual environment. Additionally, virtual reality engine 2726 may perform an action within an application in response to an action request received from user input/output module 2770 and provide feedback to the user. The provided feedback may be visual, audible, or haptic feedback. In some implementations, processor(s) 2710 may include one or more GPUs that may execute virtual reality engine 2726.

In various implementations, the above-described hardware and modules may be implemented on a single device or on multiple devices that can communicate with one another using wired or wireless connections. For example, in some implementations, some components or modules, such as GPUs, virtual reality engine 2726, and applications (e.g., tracking application), may be implemented on a console separate from the head-mounted display device. In some implementations, one console may be connected to or support more than one HMD.

In alternative configurations, different and/or additional components may be included in electronic system 2700. Similarly, functionality of one or more of the components can be distributed among the components in a manner different from the manner described above. For example, in some embodiments, electronic system 2700 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
a substrate comprising two opposite surfaces; and
a slanted grating at a first surface of the two opposite surfaces of the substrate, wherein:
the slanted grating comprises a plurality of ridges and is characterized by a grating period in one direction;
the plurality of ridges is tilted at a slant angle with respect to a surface normal of the first surface and is characterized by a height; and
the height of the plurality of ridges, the grating period, and the slant angle are configured to cause destructive interference between ambient light diffracted in both +1st order and −1st order by the slanted grating.

2. The waveguide display of claim 1, wherein:
a difference between the height of the plurality of ridges and an integer multiple of the grating period divided by the tangent of the slant angle is less than a threshold value.

3. The waveguide display of claim 2, wherein:
the threshold value is equal to or less than 10% of the height of the plurality of ridges.

4. The waveguide display of claim 1, further comprising:
an anti-reflective coating on a second surface of the two opposite surfaces of the substrate.

5. The waveguide display of claim 1, further comprising:
an anti-reflective coating on a surface of the slanted grating opposite to the first surface of the two opposite surfaces of the substrate.

6. The waveguide display of claim 1, further comprising:
an over-coat layer on a surface of the slanted grating opposite to the first surface of the two opposite surfaces of the substrate.

7. The waveguide display of claim 1, wherein:
a difference between the height of the plurality of ridges and the grating period divided by the tangent of the slant angle is less than a threshold value.

8. The waveguide display of claim 1, wherein:
the slanted grating comprises a surface-relief grating.

9. The waveguide display of claim 1, wherein:
the slant angle is greater than 50 degrees.

10. The waveguide display of claim 1, wherein:
the slanted grating comprises a two-dimensional grating.

11. The waveguide display of claim 1, wherein:
the substrate is configured to reflect display light at the two opposite surfaces by total internal reflection; and
the slanted grating is arranged with respect to the substrate to reflectively diffract the display light and transmissively diffract the ambient light from an environment in front of the waveguide display.

12. The waveguide display of claim 1, wherein:
the substrate is configured to reflect display light at the two opposite surfaces by total internal reflection; and
the slanted grating is arranged with respect to the substrate to transmissively diffract the display light and the ambient light from an environment in front of the waveguide display.

13. A grating coupler comprising:
a slanted grating characterized by a grating period, the slanted grating comprising a plurality of slanted ridges, wherein:
the plurality of slanted ridges is characterized by a height and a slant angle with respect to a surface normal of the slanted grating; and
a difference between the height of the plurality of slanted ridges and an integer multiple of the grating period divided by the tangent of the slant angle is less than a threshold value such that ambient light diffracted in ±1st diffraction orders by an upper portion of the slanted grating at least partially destructively interferes with ambient light diffracted in ±1st diffraction orders by a lower portion of the slanted grating.

14. The grating coupler of claim 13, wherein:
the height of the plurality of slanted ridges is equal to the grating period divided by the tangent of the slant angle.

15. The grating coupler of claim 13, further comprising:
an over-coat layer on the slanted grating, wherein:
the over-coat layer fills gaps between the plurality of slanted ridges; and
a refractive index of the over-coat layer is different from a refractive index of the plurality of slanted ridges.

16. An optical element comprising:
a slanted grating configured to:
destructively interfere at least a portion of ambient light diffracted in both +1st order and −1st order by the slanted grating; and
transmit the ambient light in 0th diffraction order.

17. A near-eye display comprising:
an image source;
a waveguide;
an input coupler configured to couple display light from the image source into the waveguide; and
an output coupler coupled to the waveguide and configured to:
transmit ambient light from an environment in front of the near-eye display; and
couple the display light out of the waveguide,
wherein:
the output coupler comprises a slanted grating characterized by a grating period, the slanted grating comprising a plurality of slanted ridges;
the plurality of slanted ridges is characterized by a height and a slant angle with respect to a surface normal of the slanted grating; and
a difference between the height of the plurality of slanted ridges and an integer multiple of the grating period divided by the tangent of the slant angle is less than a threshold value such that ambient light diffracted in ±1st diffraction orders by an upper portion of the slanted grating at least partially destructively interferes with ambient light diffracted in ±1st diffraction orders by a lower portion of the slanted grating.

18. The near-eye display of claim 17, further comprising:
an anti-reflective coating on a surface of the waveguide opposite to the output coupler.

19. The near-eye display of claim 17, further comprising:
an anti-reflective coating on a surface of the output coupler opposite to the waveguide.

20. The near-eye display of claim 17, wherein the output coupler further comprises:
an over-coat layer on the slanted grating, wherein:
- the over-coat layer fills gaps between the plurality of slanted ridges; and
- a refractive index of the over-coat layer is different from a refractive index of the plurality of slanted ridges.

\* \* \* \* \*